(12) United States Patent
Kuznetsov et al.

(10) Patent No.: US 7,612,138 B2
(45) Date of Patent: Nov. 3, 2009

(54) ELECTROMAGNETIC RADIATION ATTENUATION

(75) Inventors: Vladimir Lvovich Kuznetsov, Novosibirsk (RU); Olga Alexander Shenderova, Raleigh, NC (US)

(73) Assignee: International Technology Center, Raleigh, NC (US)

( * ) Notice: Subject to any disclaimer, the term of this patent is extended or adjusted under 35 U.S.C. 154(b) by 444 days.

(21) Appl. No.: 11/338,527

(22) Filed: Jan. 24, 2006

(65) Prior Publication Data

US 2006/0241236 A1 Oct. 26, 2006

Related U.S. Application Data

(60) Provisional application No. 60/646,783, filed on Jan. 25, 2005.

(51) Int. Cl.
*C08K 3/04* (2006.01)
*B32B 17/00* (2006.01)

(52) U.S. Cl. .................. 524/495; 428/334; 977/734; 977/742

(58) Field of Classification Search ............... 524/495; 428/334; 977/734, 742
See application file for complete search history.

(56) References Cited

U.S. PATENT DOCUMENTS

| | | | |
|---|---|---|---|
| 5,640,705 A * | 6/1997 | Koruga | 588/16 |
| 6,225,939 B1 * | 5/2001 | Lind | 342/4 |
| 6,486,822 B1 | 11/2002 | Peterman | |
| 6,747,870 B2 * | 6/2004 | Toh | 361/690 |
| 6,909,395 B1 | 6/2005 | Carpenter | |
| 6,986,853 B2 * | 1/2006 | Glatkowski et al. | 264/36.19 |
| 7,420,500 B2 * | 9/2008 | Treen et al. | 342/4 |
| 2002/0061397 A1 | 5/2002 | Iwamura et al. | |
| 2002/0180077 A1 * | 12/2002 | Glatkowski et al. | 264/36.1 |
| 2003/0235709 A1 | 12/2003 | Herron | |
| 2004/0071949 A1 | 4/2004 | Glatkowski et al. | |
| 2004/0188890 A1 | 9/2004 | Sheridan et al. | |
| 2004/0227112 A1 | 11/2004 | Howard | |
| 2005/0202158 A1 | 9/2005 | Millas et al. | |
| 2008/0231977 A1 * | 9/2008 | Schwaab et al. | 359/838 |

FOREIGN PATENT DOCUMENTS

RU  2094370  10/1997

OTHER PUBLICATIONS

Koudoumas et al., Onion-like carbon and diamond nanoparticles for optical limiting, May 17, 2002, Chemical Physics Letters, vol. 357, pp. 336-340.*

(Continued)

*Primary Examiner*—Walter L Lindsay, Jr.
(74) *Attorney, Agent, or Firm*—Miller Patent Services; Jerry A. Miller

(57) ABSTRACT

An electromagnetic radiation attenuating material or coating consistent with certain embodiments of the present invention uses a binding matrix with an operative quantity of electromagnetic radiation attenuating nano-particles suspended in the binding matrix, wherein, the electromagnetic radiation attenuating nano-particles comprise onion-like-carbon (OLC) particles. In other embodiments, freestanding structures, aerosols and powders or suspensions contained within an enclosure provide EM or Radar absorption, particularly in the range of about 500 MHz to about 30 THz. This abstract is not to be considered limiting, since other embodiments may deviate from the features described in this abstract.

59 Claims, 9 Drawing Sheets

OTHER PUBLICATIONS

Oh JH, Oh KS, Kim CG, Hong C.S., Design of radar absorbing structures using glass/epoxy composite containing carbon black in X-band frequency ranges, Composites Part B-Engineering 35 (1): 49-56 2004.

Chung DDL, Electrical applications of carbon materials, J.Mater. Sci., 39 (8): 2645-2661 2004.

Gubarevich A V, Kitamura J, Usuba S, Yokoi H, Kakudate Y, Odawara O, Onion-like carbon deposition by plasma spraying of nanodiamonds, Carbon 41 (13): 2601-2606 2003.

E.Koudoumas, O.Kokkinaki, M.Konstantaki, S.Couris, S.Korovin, P.Detkov, V.Kuznetsov, S.Pimenov, and V.Pustovoi, Onion-like carbon and diamond nanoparticles for optical limiting, Chem. Phys. Lett., 357, 336 (2002).

A.I. Romanenko, O.B. Anikeeva, A.V. Okotrub, V.L. Kuznetsov. Yu. V. Butenko, A.L. Chuvilin, C. Dong, and Y. Ni, Temperature Dependence of Electroresistivity, Negative and Positive Magnetoresistivity of Carbon Nanoparticles, in in S. Komarneni, J.-I. Matsushita, G.Q. Lu, J.C. Parker, R.A. Vaia (eds.), Nanophase and nanocomposite materials, vol. 703, Mat. Res. Sym. Proc., p. 259-264 (2002).

Chung D.D.L., Electromagnetic interference shielding effectiveness of carbon materials Carbon 39 (2): 279-285 2001.

Kuznetsov, V.L., Butenko, Yu.V., Chuvilin, A.L., Romanenko, A.I., Okotrub, A.V., Electrical resistivity of graphitized ultra-dispersed diamond and onion-like carbon, *Chem. Phys. Lett.*, 336 (2001) 397.

Okotrub AV, Bulusheva LG, Kuznetsov VL, et al.X-ray emission studies of the valence band of nanodiamonds annealed at different temperatures Journal of Physical Chemistry A 105 (42): 9781-9787 Oct. 25, 2001.

Kinetics of the graphitization of dispersed diamonds at "low" temperatures Butenko YV, Kuznetsov VL, Chuvilin AL, Kolomiichuk VN, Stankus SV, Khairulin RA, Segall B, Journal of Applied Physics 88 (7): 4380-4388 Oct. 1, 2000.

V. L. Kuznetsov, A. L. Chuvilin, Yu, V. Butenko, A. K. Gutakovskii, S. V. Stankus, and R. A. Khairulin, Closed curved graphite-like structures formation on micron-size diamond, Chem. Phys. Lett. 289, 353 ~1998.

Vinoy KJ, Jha RM. Radar absorbing materials from theory to design and characterization. Kluwer Academic Publishers, Boston, pp. 15 and 135, 1996.

Kuznetsov VI, Chuvilin Al, Moroz Em, Kolomiichuk Vn, Shaikhutdinov Sk, Butenko Yv, Malkov Iy, Effect of Explosion Conditions on the Structure of Detonation Soots—Ultradisperse Diamond and Onion Carbon, Carbon 32 (5): 873-882, 1994.

H. M. Kim, K. Kim, C. Y. Lee, J. Jooa, S. J. Cho, H. S. Yoon, D. A. Pejakovic, J. W. Yoo, and A. J. Epstein, Electrical conductivity and electromagnetic interference shielding of multiwalled carbon nanotube composites containing Fe catalyst, Appl.Phys.Let. 84 (4), 2004, p. 589.

Agilent Technologies application note, Basics of Measuring the Dielectric Properties of Materials, Agilent Technologies, Apr. 28, 2005.

* cited by examiner

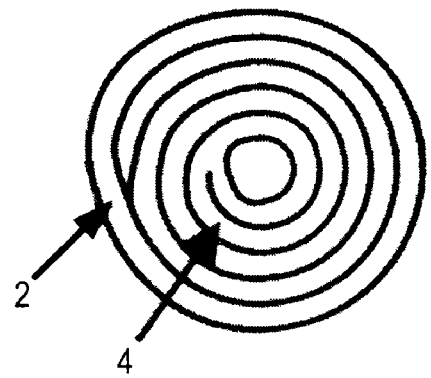
*FIG. 2B*
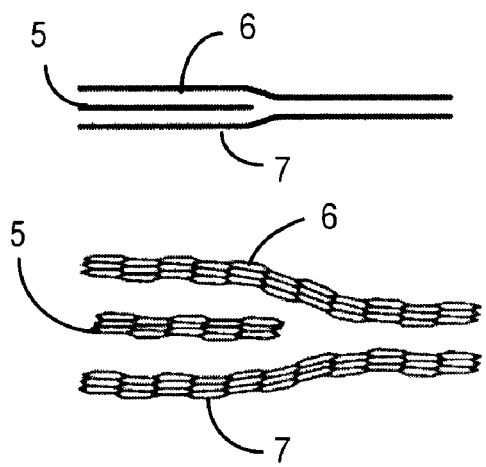
*FIG. 2C*
*FIG. 2D*
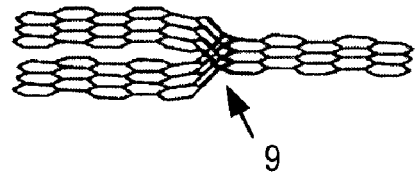

FIG. 5A MWCNT

FIG. 5E KBY-II

FIG. 5B KBY-I

Dice-2

FIG. 5D Dgas-2

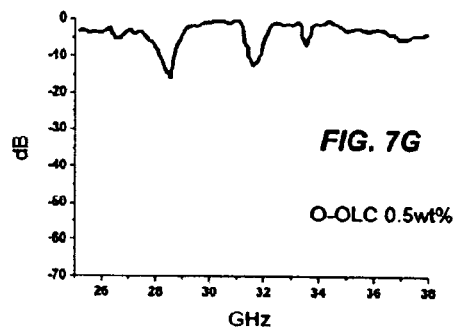
FIG. 7G
O-OLC 0.5wt%
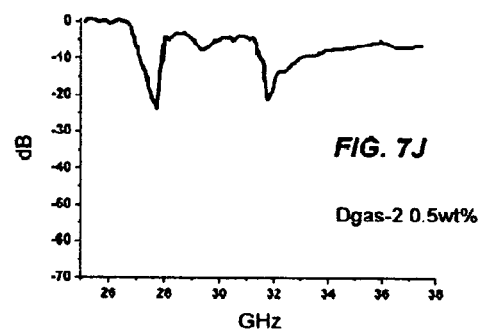
FIG. 7J
Dgas-2 0.5wt%
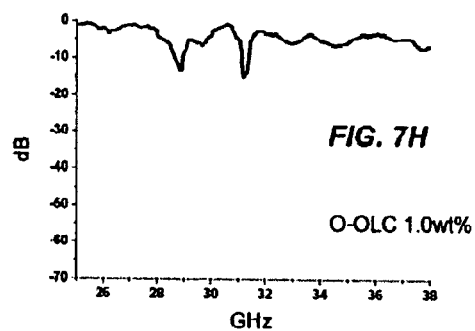
FIG. 7H
O-OLC 1.0wt%
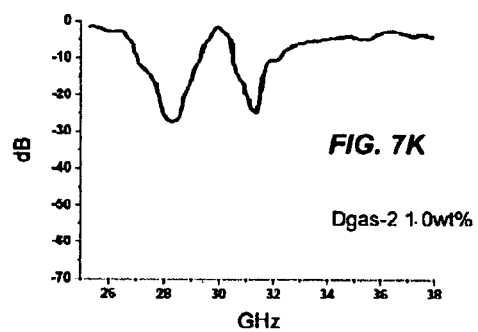
FIG. 7K
Dgas-2 1.0wt%
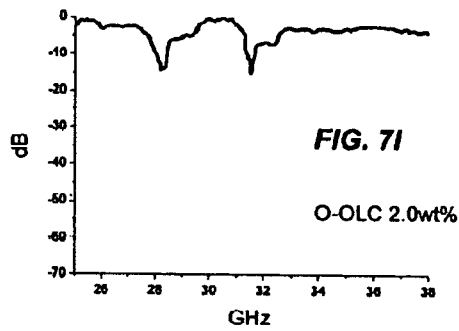
FIG. 7I
O-OLC 2.0wt%
*FIG. 7 Cont.*

ELECTROMAGNETIC RADIATION ATTENUATION

CROSS REFERENCE TO RELATED DOCUMENTS

This application claims priority benefit of U.S. patent application No. 60/646,783 filed Jan. 25, 2005 which is hereby incorporated by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Electromagnetic (EM) radiation attenuating technology is useful for a wide variety of military and civilian applications ranging from minimizing the Radar signature of a target to EM shielding in consumer electronics. EMI (Electromagnetic Interference) shielding of electronic systems to decrease susceptibility to, and radiation from, EM sources is increasingly important in both civilian and military applications—perhaps particularly at the radio to microwave wavelengths. The usual shielding techniques focus on the use of metals and their composites. Such materials provide shielding due to their conductivity, but they have the disadvantages of heavy weight, limited flexibility and difficulty of matching attenuation requirements with packaging constraints.

Kuznetsov et al. discovered that the annealing of nano-diamonds (with diameters of 2-5 nm) results in the formation of Onion-Like Carbon (OLC) particles with a structure of concentric carbon shells having various defects in the shell structures. This work is described in Russian Patent document 2094370, which is hereby incorporated by reference.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
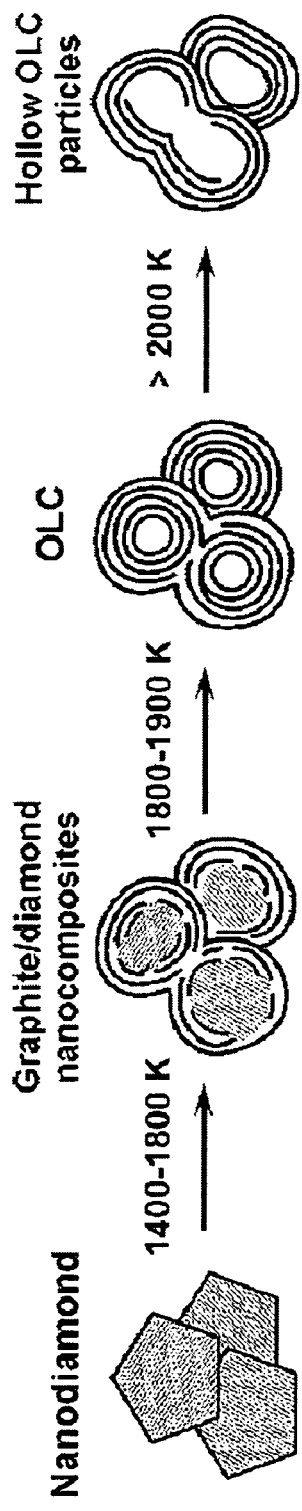
FIG. 1 illustrates structures of OLC particles when nano-diamond particles are annealed at varying temperatures.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For purposes of this document, the prefix "nano" as used, for example in "nano-particle" is intended to refer to particles having length in at least one dimension in the range of approximately 1-500 nanometers. However, in some particular cases, the length scale for achieving the novel properties and phenomena consistent with certain embodiments of the present invention may be up to about 1000 nanometers (for example, the size of large OLC aggregates).

For purposes of this document, the term Onion-Like Carbon (OLC) particles is used to refer to nano-particles such as those disclosed by Kuznetsov et al. which are characterized as layered carbon structures. Such OLC particles are not to be confused with carbon onions. While carbon onions are structures made up of enclosed fullerenes, OLC particles are nano-particles of a different class made up of concentric carbon shells which have one or more defects in one or more of the carbon shells. Several different types of defects have been noted including (holes, unpaired electrons, $sp^2/sp^3$ irregularities, etc.). OLC shells can be rounded or elongated and several smaller OLC particles can form agglomerates where the whole agglomerate is sometimes enclosed in a larger graphite-like shell. The term OLC will also be used to refer to such agglomerations of OLC particles, even though such agglomerates may exceed the above size constraints. OLC particles have been obtained by annealing of nano-diamonds, but production by this method should not preclude other manufacturing methods including manufacturing methods as yet undiscovered from use in embodiments consistent with the present invention.

Depending on the annealing temperature, OLC particles have one or more structural defects. In OLC particles there can be a combination of $sp^2/sp^3$ types of bonding while ideal carbon onions are made of $sp^2$ type shells. Ideal carbon onions are made up of layers of enclosed fullerene molecules of differing sizes (e.g., C60, C240, C540, C960, etc.). An OLC is therefore not, strictly speaking, a caged compound. Usually, but not always, the term "OLC particles" is used in connection with particles having a substantial number of structural defects, however, a single defect may be sufficient to distinguish between carbon onions and OLC particles. OLC particles will be further characterized later.

As used herein, the term "binding matrix" is defined as a substance within which the OLC particles are contained or suspended. In some instances, actual binding of the particles may take place only after the binding matrix is cured. Examples include, but are not limited to, paints, resins, plastics or polymer coating. The term "cure" as used herein is used to refer to a drying or other curing or setting process. For example, a paint may cure by drying, whereas an epoxy may cure by setting in accordance with a chemical bonding process. Examples include, but are not limited to radiation exposure, chemical accelerants, etc. Generally, in the case of wet binding matrices, a cured matrix will also achieve a degree of dryness. However, certain binding matrices may be dry upon application (e.g., in a powder form) which cures by heat or other influences (e.g., impact) to form a coating without being in a wet or liquid state. In such cases, the term "binding" in "binding matrix" refers to the particles being bound upon curing.

The term "suspension" as used herein means that nano-particles are not necessarily securely bound in a fixed position as in a binding matrix, but are in a suspended state within a liquid, gel, paste, or other state of material which is not within the bounds of the term binding matrix as explained above.

The nano-particles may also be distributed in a gaseous-like liquid carrier such as by blending with a liquid and sprayed as an aerosol. In this case, the nano-particles are generally suspended in liquid droplets of varying size which can be made airborne in the aerosol, either for use in the aerosol state, or for use as a part of a coating process (e.g., as a paint additive). Such an arrangement is referred to herein as an aerosol, without regard for the size of droplets formed in the aerosol. The nanoparticles may also be distributed in a gaseous carrier.

An electromagnetic radiation attenuating material or coating consistent with certain embodiments of the present invention uses a binding matrix with an operative quantity of electromagnetic radiation attenuating nano-particles suspended in the binding matrix, wherein, the electromagnetic radiation attenuating nano-particles comprise onion-like-carbon (OLC) particles. In other embodiments, freestanding structures, aerosols and powers or suspensions contained within an enclosure provide EMI shielding, Radar absorption or low electromagnetic observability, particularly in the range of about 500 MHz to about 30 THz. It currently appears that the desirable properties of OLC particles for EM shielding or absorption may involve several attenuation mechanisms that might include attributes of shielding, conducting, reflecting, absorbing and/or scattering effects. Hence, the term "attenuating" and its variants can be used to mean "absorbing" and/or "shielding" depending upon the context and should not be strictly construed to imply a single mechanism that produces the desired effect. For example, in Radar applications the objective is attenuation of reflected signals that reveal a target fingerprint. Thus, absorption and scattering mechanisms can be useful in this application. In EMI shielding applications, the objective may be to contain EMI radiation to prevent interference with operation of nearby devices, in which case absorption, scattering and reflection properties could be useful. Thus, attenuating may be construed to mean attenuation of a clear reflected signal (as in the radar example), or as containment (as in the EMI shielding example), or other mechanisms in other embodiments.

FIG. 1 is a schematic illustrating structures of OLC manufactured by annealing nano-diamonds at various temperatures. Depending on the particular annealing regime used, a wide variety of nano-structures can be obtained, ranging from nano-diamond core surrounded by graphite shells (annealing temperature below 1800K), onion-like concentric multi-shell structures (temperatures up to 1900K) and hollow onion-like structures (temperature above 1900K). At the same time, by increasing the time of annealing (for example at 1600K), the diamond core can disappear. Kinetic constants can be used to calculate the complete transformation.

OLC aggregates are obtained by annealing of nano-diamond aggregates. Within the aggregates, OLC particles are linked to each other with defect graphite-like sheets and C—C bonds. Some part of the OLC may be represented by elongated particles with linked external graphitic layers and closed quasi-spherical shells. A graphite-like shell can be defined as a structure having predominantly six-fold atomic rings, but five-fold or seven-fold atomic rings as well as holes and structures with mixed $sp^2/sp^3$ irregularities can be present. Diamond/carbon nano-composites with controlled $sp^3/sp^2$ ratio can be synthesized by controlling annealing temperature and annealing time.

Figure 2A:
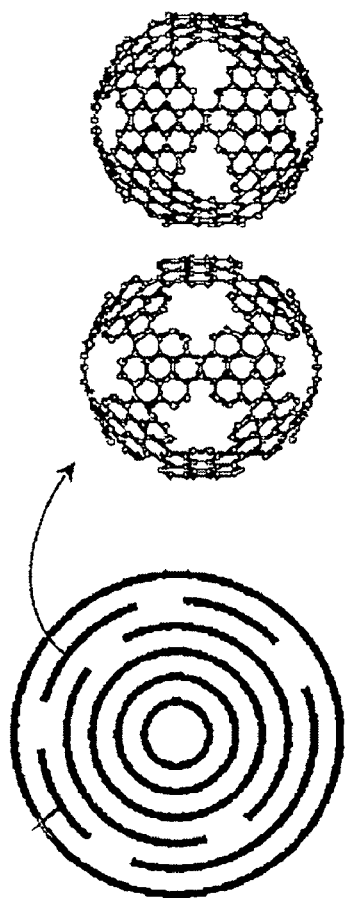
FIG. 2, which is made up of FIGS. 2A, 2B, 2C and 2D, illustrates various OLC particle defects.

Referring to FIG. 2, various example types of OLC defects (as theorized) are depicted, starting with FIG. 2A, which depicts graphitic-like structures containing holes within OLC. Study of X-ray emission spectra of OLC combined with quantum-chemical simulation for the characterization of their electronic structure leads to the conclusion that the OLC produced by ND annealing at the intermediate temperature (1400-1900K) have holes in the internal shells. While not wishing to be bound by any theory of operational mechanisms, it is believed that the origin of such defects accompanying the OLC formation can be explained in terms of deficit of diamond carbon atoms in the diamond/graphite interface. These structures are characterized by well localized radicals in the inner cores, conjugated $\pi$-systems, and can contain up to about $3.9 \times 10^{19}$ localized spins/gram. FIG. 2B depicts an OLC having a "Y" junction 2 and a spiral-like structure with an interstitial plane between two basal planes at 4. FIG. 2C further illustrates an interstitial plane 5 between two base planes 6 and 7. FIG. 2D further illustrates a Y junction of two basal planes merged into a single plane at 8 as well as a chain of $sp^3$ carbon atoms at 9.

While embodiments consistent with the present invention should not be constrained to the theory of operation presented herein, it is believed that besides conductivity typical of $sp^2$-carbon fillers, OLC particles, and agglomerates thereof, may have unpaired electrons in the particle core that appear to provide enhanced EM absorption properties. The OLC material properties and high electron density provide a variety of mechanisms that are believed to contribute to absorption of electromagnetic energy over a wide frequency range including electronic and radical polarization, dipole polarization formed by elliptic onion-like structures as well as microscopic polarization of OLC aggregates. These mechanisms are believed to enhance conductivity as well as provide for varying particle shapes and sizes which provide the mechanisms for creating a wideband electromagnetic radiation absorbing material (EMAM). It is noted that carbon itself is not inherently a good EM absorbing material, and in particular, unmodified carbon fullerenes are not particularly good EM absorbing materials. However, OLC particles appear to exhibit significant EMI shielding attributes that can be exploited in accordance with embodiments consistent with the present invention.

The sample OLC particles demonstrate the temperature dependence typical of the systems with variable hopping-length hopping conductivity. The dimensionality of the space for current carrier movement varies between ½, 1 and ³⁄₂ depending on the annealing temperature. Due to change of types of defects with temperature of OLC processing (as shown in FIG. 1), free length of electrons in the OLC samples varies and thus conductivity appears to depend nonlinearly on the annealing temperature.

There are known mechanisms to control sizes of ND aggregates. The sizes of OLC aggregate obtained by annealing of ND can be controlled accordingly by using nano-diamond particles and their aggregates of appropriate size to obtain a desired OLC aggregate size. Thus OLC particles possess unique structures with hierarchical assembly and with tunable conductivity. Since the defects and sizes of the OLC particles and agglomerates can be controlled, the EM absorption properties can be tuned to achieve a desired result. The particular effects of variation of each of these properties can be determined experimentally, and such data used to produce tuning effects. The rich carbon chemistry of OLC and their aggregates provides a wide variety of mechanisms for dissipation of energy of electromagnetic radiation at different length scales efficient for different ranges of EM radiation frequencies.

OLC particles encapsulating magnetic nano-particles or impurities of magnetic metals can be also produced, and may optionally be used in accordance with certain embodiments consistent with the present invention. OLC and sp OLC based composites containing super-paramagnetic nano-particles of iron, cobalt and iron oxide can be produced for example using one of the effectively used methods of decomposition of supported metal carbonyls from the gas phase. Incorporation of the metal inclusions to Detonation Nano-Diamonds (DND) and, consequently to OLC may be achieved at the stage of detonation of carbon-containing explosives by adding metals to the explosive materials or to a soot cooling media in the detonation chamber. Such metal inclusions may be desirable in certain embodiments and undesirable in others. Their particular impact on a given application can be readily determined experimentally.

OLC may be present in a small amount in detonation soot, produced by detonation of carbon-containing explosives. Detonation soot may also contain other types of graphitic structures and nano-diamonds and it is very inexpensive material. Thus it can be also considered for the EM absorption applications. Detonation soot itself can be also used for production of OLC by soot annealing (however, purification of soot from metal impurities might be required).

RAM (Radar Absorbing Materials) is a class of EMAM (ElectroMagnetic Absorbing Material) that is utilized for absorbing Radar signals to hide or disguise a Radar signature. Manufacturing of RAM basically involves the use of compounds causing dielectric or magnetic loss when impinged by electromagnetic waves. Certain embodiments consistent with the present invention can be used for various military applications such as (for example) minimizing the Radar signature of a target and EMI shielding. Certain embodiments may also find application in consumer and industrial electronic equipment, such as for example, computer enclosures, cellular phones enclosure, game console enclosures, medical equipment, etc. In still other applications, certain embodiments may be utilized in circuit board EMI shielding layers (including very thin films (inter-level and intra-level dielectrics in multiple-stacked chips), and for electrical cord enclosures, as well as additions to structural and decorative materials in buildings (e.g., paints) for EMI shielding. Polymer injection and/or transfer/compression molding technologies developed for creating electronic enclosures for different electronic device applications may be modified by incorporation of OLC particles into the material being molded to provide EMI shielding. For EMI shielding applications, the EMAM material often, but not necessarily, should provide shielding in the frequency range of about several hundred MHz to about several hundreds of GHz (in applications such as removal of ghost images in TV pictures 1-20 GHz range is preferred while for applications in anechoic chambers 100 MHz-100 GHz range might be used), while military RAM applications should provide EM absorption from about several GHz to tens of GHz in conventional Radar applications; EMAM materials for the THz region also may be useful for certain applications.

Extension of this technique to fabrication of polymer composites incorporating OLC particles would appear to be straightforward by blending the nano-particles in an operative quantity to the matrix prior to molding. These and other applications, in accordance with certain embodiments consistent with the present invention, can provide for preventing unauthorized access to information networks, reducing impact on electronic devices from EM pulse attack, reducing the effective reflection of objects in cm- and mm-wavelength ranges, reducing parasitic radiation from junctions, trailers, transmission lines, and improving technical characteristics of microwave elements, circuits and devices, or other potential advantages. However, failure of an embodiment to meet any one of the above advantages or applications does not suggest that the embodiment does not fall within the scope of embodiments consistent with the present invention. Other applications, embodiments, and advantages will occur to those skilled in the art upon consideration of the present teachings.

Thus, an electromagnetic radiation attenuating material consistent with certain embodiments of the present invention uses a binding matrix with an operative quantity of electromagnetic radiation attenuating nano-particles suspended in the binding matrix, wherein, the electromagnetic radiation attenuating particles comprise onion-like-carbon (OLC) particles. Such materials may be used in coatings or to produce free-standing structures.

In another embodiment, using OLC powder enclosed within a cavity of a particular shape can be beneficial for EM shielding. In another embodiment suspensions of OLC dispersed in liquid (or other carrier medium) and placed within a cavity would be useful. OLC dispersed in a gas as an aerosol to provide EM shielding can be also useful in certain applications.

Such materials disclosed herein may be effective for absorption at frequencies starting on the order of about one GHz and higher. Specifically, the present materials, coating etc. are intended primarily for use of their absorptive and/or shielding properties in at least a particular portion of the frequency range of about 500 MHz to about 30 THz. The particular absorptive properties obtained depend greatly on a number of variables which can be tuned by experimentation. Such variables include, but are not limited to, quality of the OLC particles, sizes, carrier, additives, combination of OLC of different types, combination of OLC with other nano-carbon materials, annealing temperature, concentration and other variables.

In certain embodiments, an electromagnetic radiation attenuating structure is created having a substrate with a layer of electromagnetic radiation attenuating material covering at least a portion of the substrate. The electromagnetic radiation attenuating material has a binding matrix, and an operative quantity of electromagnetic radiation attenuating nano-particles suspended in the binding matrix, wherein, the electromagnetic radiation attenuating nano-particles comprise onion-like-carbon (OLC) particles. In other embodiments, the nano-particles can be cast or molded into composite materials to produce the desired EM absorbing properties.

In accordance with certain embodiments consistent with the present invention, nano-structured coatings containing onion-like carbon (OLC) in a pure phase or dispersed in polymer matrix or other binding matrix or between layers as well as OLC particles encapsulating magnetic nano-particles (that is, magnetic impurities and nano-particles are inside the OLC particles and their aggregates) or intercalating atoms of metals can be used as wideband electromagnetic radiation attenuating material. Encapsulation of OLC inside a metallic coating is also possible. This can be achieved, for example by depositing a thin metal layer over OLC powder using a deposition technique such as sputtering, for example.

Figure 3:
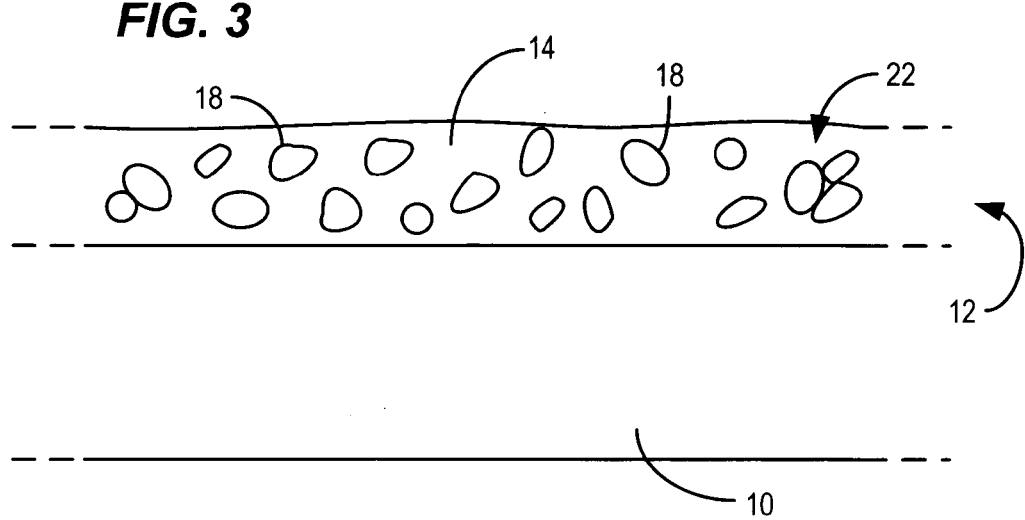
FIG. 3 is a diagram depicting a Radar or electromagnetic radiation attenuating coating applied to a substrate in a manner consistent with certain embodiments of the present invention.

FIG. 3 depicts a substrate 10 coated with an electromagnetic radiation attenuating coating consistent with certain embodiments. In this illustration, substrate 10 is coated with coating 12 which is made up of a binding matrix 14 containing OLC particles such as 18. The binding matrix may also carry clusters or agglomerates of OLC particles such as those depicted as 22, in certain embodiments. While a single layer of coating on a single layer of substrate is shown, multiple layered structures are also contemplated. The coating 12 may be a polymer matrix such as polymethylmethacrylate (PMMA), polytetrafluorethelyne (PTFE)), polycarbonate, polystyrene, polyurethane, polyimide, acrylics, a paint or epoxy coating, or resin, etc. and can be applied to the substrate using any number of techniques. Molded polymer composites with OLC can be used without a special substrate, in order to form housings, covers, gaskets, containers or enclosures for electronic systems. Different methods of curing (such as thermal curing, for example) can be used to form free-standing structures (e.g., molded parts) with EM absorptive properties. OLC powder can be also enclosed between layers of other materials, for example polymer films. Multiple-stacked structures can be formed in this way.

Candidates for use as the binding matrix also include, but are not limited to: elastomers, methacrylic, phenolic, vinyl, silicone, polyester, polyurethane foam (PUF), PDMS (poly-dimethylsiloxane), conducting polymers, vinyl polymers, phenol formaldehyde, neoprene, rubber, silicone rubber compounds, polypyrrole, polyanilene, polyacetylene, polythiophene, poly-p-phenylene, polyacrylthiophene, poly-p-phenylene-benzo-biz-thiozole (PBT), butadieneacrylonitrile, conductive fibers, ceramics (e.g., $SiO_2$, $Al_2O_3$), conductive polyethylenes (CPE), polyethyelene compounds with poly-isobutylene, ethylene ethyl acrylate copolymers, extruded polystyrene foam (e.g., Styrofoam™), and expanded polyvi-nylchloride (e.g., Spongex™), to name but a few examples. The selection of the polymer matrix is not believed to be critical, and the specific application will generally dictate which binding matrix is used. For example, for EMI shielding applications in consumer electronic devices an epoxy resin may be preferred. For any matrix the nano-particles should preferably, but not necessarily, be uniformly or near uniformly dispersed in the binding matrix.

As a mechanism of synthesis of coatings pure OLC as well as OLC dispersed in a polymer matrix, different techniques can be used that include, for example, spin-on coating of a polymer suspension, spray techniques, fluidized bed, dipping, painting and wiping to mention just a few. The spray techniques include paint spray, electrostatic spray, hot melt spray, high velocity high temperature spray, thermal spray, plasma spray, and ultrasonic spray. Spray techniques may be a practical way to synthesize coatings on large free-standing surfaces. Using different spray techniques OLC-based coatings (e.g., RAM) can be applied over large free-standing surfaces (e.g., an aircraft body), in applications for protection of civilian or military aircraft, ships or other transportation vehicles or structures.

The coatings can be made lightweight as compared to the magnetic material coatings that are often used because of the lower average atomic mass of the carbon-based OLC in comparison to the higher atomic mass of metals. In addition, OLC-based polymer composites are relatively easy to process and provide improved polymer abrasion resistance and thermal stability. Some volume fractions of nano-diamond particles can also be incorporated into the matrix to improve the abrasion resistance and mechanical strength of the coating.

The properties of the coating may be modifiable by making variations in the mixture and/or by adding various other additives or alterations to the nano-particles themselves. The following modifications are proposed as only a partial list of potentially useful variants:

- use of OLC particles with different content of $sp^2/sp^3$ bonds.
- use of OLC particles having variations in defect structure.
- use of OLC aggregate fractions with varying sizes. Particle sizes ranging from approximately 1 μm down to approximately 5 nm.
- use of OLC particles with addition of magnetic metal substances, for example, Fe, Ni, Co, Mn, iron oxides and others.
- use of OLC particles obtained from detonation diamonds.
- use of OLC complexes containing OLC particles containing particles obtained by annealing of detonation soot.
- use of functionalized OLC particles, for example by fluorine and other surface functional groups.
- use of combinations of OLC particles with other carbon nano-materials such as carbon nano-tubes, carbon black, nano-diamonds, diamondoids and other related materials.
- use of combinations of OLC particles with other nano-materials.
- use of OLC particles in form of aerosol.
- use of OLC particles dispersed in liquid media, viscous media or in a form of pasts.
- use of OLC composites in personnel protection clothing.
- use of OLC particles forming a film on a substrate from solely pure or functionalized OLC.
- use of a layer of OLC particles enclosed between layers of other material as well as multilayered structures of this arrangement.
- use of OLC particles in a matrix such as polymer, ceramic and others.

use of mixtures of OLC particles of different sizes and $sp^2/sp^3$ ratios (depending on annealing temperature) in a matrix.

use of OLC particles in very thin polymer films (down to perhaps 5-10 nm).

use of a monolayer of OLC particles or single layer OLC grafted on a surface.

use of encapsulating OLC particles (e.g., encapsulating magnetic nano-particles and/or impurities within the OLC particles).

use of OLC particles encapsulated by a metal or other materials shell.

use of well-ordered structures of OLC particles of similar sizes (forming 2 dimensional or 3-dimensional lattice).

use of the above variants in carbon onions where applicable, or in combination with carbon onions.

It is important to note that the above list is by no means considered exhaustive or limiting in any way.

Thus, an electromagnetic radiation attenuating material for absorbing electromagnetic radiation in at least a portion of the frequency range of approximately 500 MHz to 30 THz, has a binding matrix; and an operative quantity of electromagnetic radiation attenuating nano-particles suspended in the binding matrix, wherein, the electromagnetic radiation attenuating nano-particles comprise onion-like-carbon (OLC) particles.

Figure 4:
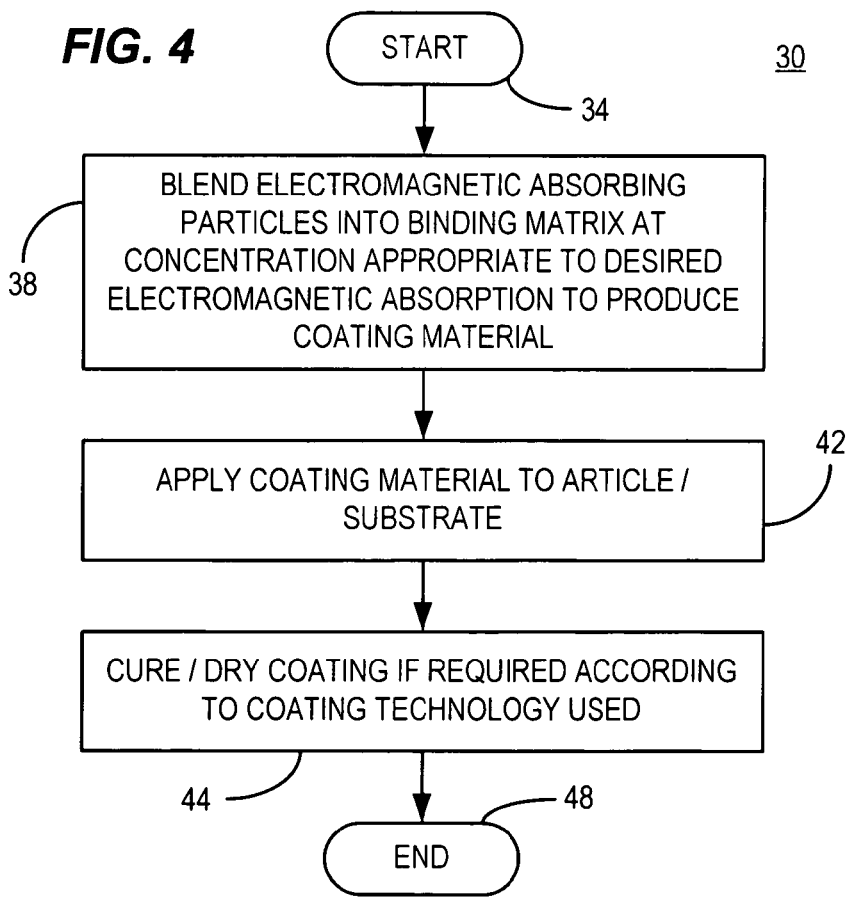
FIG. 4 is a generalized flow chart depicting a coating process consistent with certain embodiments of the present invention.

FIG. 4 generally describes a process 30 for both manufacture of the coating material and application of the coating starting at 34. At 38, operative quantities of OLC particles, which may be functionalized or processed with any of the above variations, are blended into the binding matrix which serves as a carrier and binder for the nano-particles. The concentration of onions or OLC can be determined experimentally to achieve a desired degree of electromagnetic radiation absorption, as will be described in connection with the experiments that follow, but may generally be in the range of 0.1-25.0% by weight (based on the literature, up to 25 wt % of carbon nano-tubes or carbon black has been applied, and it is anticipated that similar percentages of OLC particles, or perhaps even greater percentages, could similarly be used), or in the range of 0.5-5.0% by weight.

At 42, the coating can be applied to the article to be coated (i.e., the substrate—which may, for example be a panel of an aircraft that is to have reduced Radar visibility). Any of a number of application processes is appropriate for this process. If required, depending upon the binding matrix, the coating can then be cured or dried at 44, depending upon the technology used.

The curing process 44 may be a negligible part of certain processes while in other processes curing may be a more extensive and may involve, for example, application of heat, ultraviolet light, or exposure to cure accelerants or other catalysts.

In an alternative embodiment, rather than applying the coating to an article or substrate at 42, the blend can be molded or otherwise fashioned into a free-standing article (e.g., a shield or molded aircraft part or transportation vehicle part) at 42. In either event, the process ends at 48.

Thus, in accordance with certain embodiments, a method of providing an electromagnetic radiation attenuating coated structure involves providing an electromagnetic radiation attenuating coating, comprising a binding matrix, and an operative quantity of electromagnetic radiation attenuating nano-particles suspended in the binding matrix, wherein, the electromagnetic radiation attenuating nano-particles comprise onion-like-carbon (OLC) particles; and applying the electromagnetic radiation attenuating coating to at least a portion of a surface of a substrate. The method may further involve curing the electromagnetic radiation attenuating coating after applying the electromagnetic radiation attenuating coating to the surface of the substrate. The coating may be applied by spraying the electromagnetic radiation attenuating coating onto the surface of the substrate. In certain embodiments, the coating may be premixed, while in others, the process may involve blending the electromagnetic radiation absorbing nano-particles into the binding matrix to a predetermined concentration. The substrate may, for example, be an aircraft part.

Experiments:

OLC particles suitable for use in connection with embodiments consistent with the present invention are believed to generally, but not necessarily, range in size from approximately 5 nm to approximately 1 μm when formed as aggregates. Concentrations of the nano-particles ranging from 0.5% to 5.0% by weight have been utilized successfully in experiments, and it is anticipated that concentrations ranging from about 0.1% to about 20.0% will provide a useful range of absorption for many applications, but this should not be considered limiting since other concentrations may also be beneficial in certain applications.

OLC can be produced from different types of nano-diamonds (ND) with sizes of primary particles ranging from approximately 2 to approximately 10 nm by high temperature annealing in inert gas or vacuum conditions. Particularly, nano-diamonds of detonation origin (detonation nano-diamond) can be used for this purpose. Other types of nano-diamonds used for phase transformation to OLC during annealing can be, for example, ND nucleated in the gas phase at ambient pressure, obtained by high pressure-high temperature graphite transformation within a shock wave, or produced by other methods.

Detonation NDs (DND) are synthesized at the high pressure-high temperature conditions within a shock wave during detonation of carbon-containing explosives with a negative oxygen balance. In this method diamond clusters are formed from carbon atoms contained within explosive molecules themselves, so only the explosive material is used as a precursor material. A wide variety of explosive materials can be used. One example of a typical explosive is a mixture of TNT (2-methyl-1,3,5-trinitrobenzene) and hexogen (hexahydro-1,3,5-trinitro-1,3,5-triazine) (RDX) composed of C, N, O and H with a negative oxygen balance (i.e. with the oxygen content lower than the stoichiometric value required to react with the elements C, H of the explosive), so that 'excess' carbon is present in the system. The explosion takes place in an inert (non-oxidizing) to carbon gas medium that plays the role of a coolant and is either gas ($N_2$, $CO_2$, Ar or other medium under pressure) or ice (water), so called 'dry' or 'wet' synthesis, correspondingly). A typical average particle size of DND is within the size range of 3-5 nm. The product obtained by detonation, called detonation soot, contains the diamond nano-particles along with other carbon structures. A variety of techniques can be used to separate the ND phase from soot, for example, by oxidizing the non-diamond carbon. In the final product—DND powder, nano-diamond primary nano-particles form tightly and loosely bonded aggregates ranging in the largest dimension from several tens to several hundreds of nanometers.

In the examples presented below, several types of DND obtained from different vendors were used for production of OLC. Some DND were produced in a chamber containing a gas medium as a coolant (Dh, Dn, Dgas series) and one type of DND was produced using an ice coating around the detonation charge (Dice series). For OLC production, the initial DND were gradually heated up to 1800-2140K temperatures (see TABLE 1) and annealed for several hours in a vacuum chamber (up to $10^{-5}$ torr).

More specifically, sample Dh-01 was prepared as follows. DND was obtained by explosion of TNT/RDX in a $CO_2$ atmosphere and oxidized in $H_2SO_4$:$HClO_4$ (3:1) at 200° C., washed with water, and dried. Then the process of OLC production started: DND was heated in a vacuum ($10^{-2}$ torr) at 850° C. for 3 hrs. Then the sample was heated in vacuum ($5*10^{-4}$-$1*10^{-4}$ torr) as the temperature was ramped from 1400K to 1800K over 1 hr followed by heating at 1800K for 3 hrs.

Sample Dgas-02 was prepared as follows: DNDs were obtained by explosion of TNT/RDX in a $CO_2$ atmosphere and oxidized in concentrated sulfuric acid and chromic anhydride at 110° C., washed with water, and dried. DNDs were heated in a vacuum ($10^{-2}$ torr) at 850° C. for 3 hrs. Then the sample was heated in a vacuum ($5*10^{-4}$-$1*10^{-4}$ torr) at 1800K for 3 hrs.

Sample Dice-02 was prepared as follows: DNDs were obtained by explosion of TNT/RDX in an ice coating and oxidized by ozone treatment. The DNDs were heated in a vacuum ($10^{-2}$ torr) at 850° C. for 3 hrs. Then the sample was heated in a vacuum ($5*10^{-4}$-$1*10^{-4}$ torr) at 1900K for 2.1 hrs.

Sample Dice-03 was prepared as follows: DNDs were obtained by explosion of TNT/RDX in an ice coating and oxidized by ozone treatment. To produce OLC, DND was heated in vacuum ($10^{-2}$ torr) at 850° C. for 3 hrs. Then the sample was heated (ramp up time was 2 hrs) in a vacuum ($5*10^{-4}$-$1*10^{-4}$ torr) and annealed at 2000K for 20 min.

Sample Dn-1 was prepared as follows: DNDs were obtained by explosion of TNT/RDX in a $CO_2$ atmosphere and oxidized by boiling in $H_2SO_4$:$HC_1O_4$ (3:1); washed with water, and dried. Then the sample was heated in a vacuum ($10^{-5}$ torr) at 2140K for less than 1 hr.

Sample OLC-O was prepared as follows: DNDs were obtained by explosion of TNT/RDX in a $CO_2$ atmosphere and oxidized in $H_2SO_4$:$HC_1O_4$ (3:1) at 200° C., washed with water, and dried. Then the DNDs were heated in a vacuum ($10^{-2}$ torr) at 850° C. for 3 hrs. Then the sample was heated in vacuum ($5*10^{-4}$-$1*10^{-4}$ torr) at a temperature ramp from 1400K to 1800K for 1 hr followed by heating at 1900K for 3 hrs.

General Characteristics of OLC

Since the initial DNDs had different purity levels (in terms of elemental composition and in the content of non-diamond carbon phase) OLC that were used for the EM absorption tests also have varying purity. The magnetic metals impurity content in the tested nano-carbons is provided in TABLE 1. OLC samples have traces of Cu ~0.01-0.05 wt %. Impurities of magnetic metals may result in additional EM absorption. At the same time, there can be a special product developed—OLC encapsulated with magnetic impurities that can provide additional benefits for EM absorption. The bulk density of the powder samples is also provided in TABLE 1.

For comparison of EM absorption properties, other types of carbon nano-structures were also used as follows:

MWCNT—multiwall carbon nano-tubes of CVD synthesis produced in Boreskov Institute of Catalysis via acetylene decomposition on precipitated $Fe_2Co$/$CaCO_3$ type catalysts at 660° C.; 10-20 nm in diameter and several microns long. The sample contains up to 0.9 and 0.4 wt % of Fe and Co respectively, which can provide additional EM absorption.

KBY-I and KBY-II—catalytic filamentous carbon, produced in Boreskov Institute of Catalysis via methane decomposition on Ni/$Al_2O_3$ and NiCu/$Al_2O_3$ catalysts respectively at 500-600° C. KBY-I and KBY-II have different orientation of graphene planes to the fiber axes (inclined in V-shape and parallel facets oriented perpendicular to the filament axis for I and II, correspondingly); thickness of filaments ~20.0-60.0 nm, length~several microns. KBY I sample contains 0.9 wt % of Ni used as a catalyst, while KBY II-0.3 wt. % of Ni, which can provide additional EM absorption.

Detonation soot—was obtained by explosion of TNT/RDX in a $N_2$ atmosphere and contains about 70 wt % of nano-diamond and the rest—amorphous and graphite-like carbon (with a small (an order of a percent) admixture of OLC). Metallic impurities are Fe and Cu 1.3 and 0.3 wt %, correspondingly.

Nanodiamonds—DNDs used for testing transmission loss were obtained by explosion of TNT/RDX in an ice coating and non-diamond carbon oxidized by ozone treatment.

Another characteristic influencing EMI shielding property is the electrical conductivity of the shielding material. In general, different nano-carbon structures have different conductivities. The resistivities of the graphite or carbon nano-tubes measured in powder form can be $10^{-3}$ Ohm·cm or smaller; the resistivity for OLC measured in a powder form can be about ~0.2-1 Ohm·cm or more; that of carbon black is of the order ~0.1-$10^{-2}$ Ohm·cm. Resistivity of KBYI is 0.025 Ohm·cm, KBY II—0.12 Ohm·cm.

Characterization of EM Absorption Properties: Powders

Figure 5F:
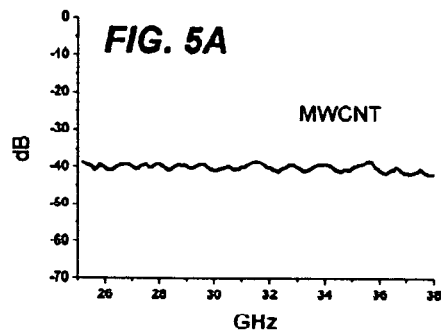
FIG. 5 is a collection of graphs (FIGS. 5A-5G) of transmission loss for powder samples in the 25.95-37.5 GHz range.
Figure 5F:
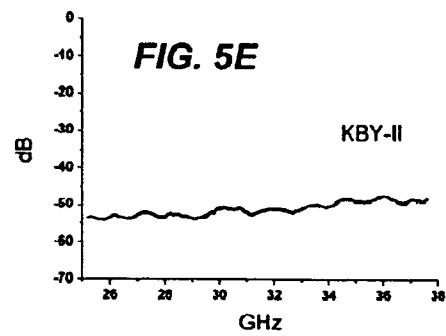
Figure 5F:
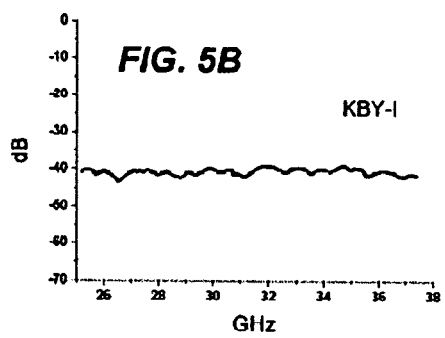
Figure 5F:
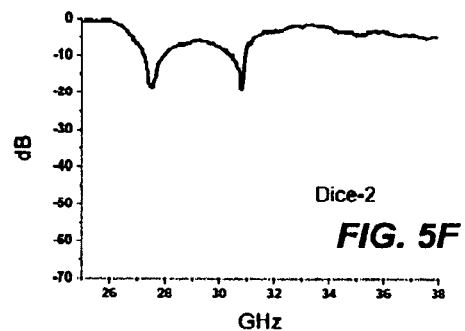
Figure 5:
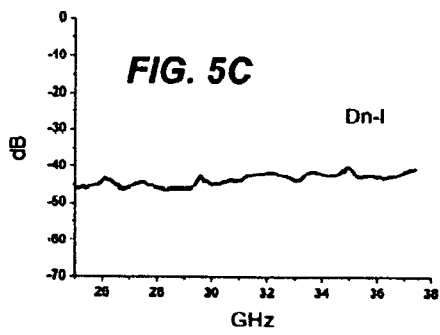
Figure 5:
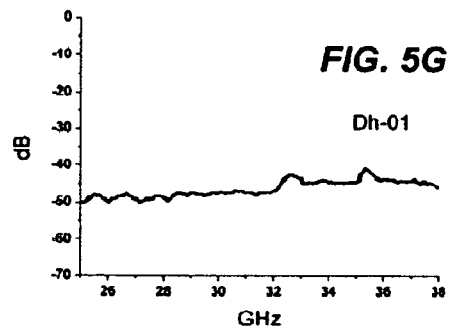
Figure 5:
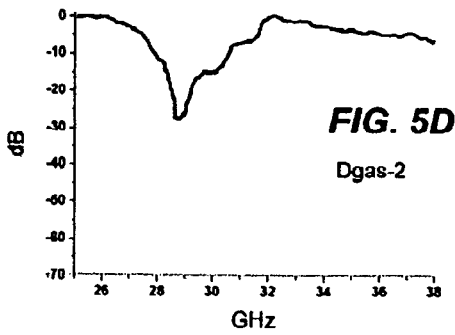

Measurement of EM absorption was performed on powders of OLC and other nano-carbon structures (for comparison) as well as on OLC-polymer films. Three EM radiation frequency ranges have been studied: 26-37 GHz, 8-12 GHz and 2-5 GHz (subsequent THz range tests were conducted and are described later). The measurements in the 26-37 GHz range, 8-12 GHz and 2-5 GHz ranges were done using a standard waveguide and a scalar network analyzer. The ranges 26-37 GHz and 8-12 GHz are used in Radar operations (so called Ka-band and X-band, correspondingly). The range 2-5 GHz is used in Radar applications (S-band, 2-4 GHz), but shielding is also often needed in this range for applications in consumer electronics and shielding of medical devices. The transmission loss of the various powder samples are shown in FIG. 5, with FIG. 5A representing the absorption of the MWCNT sample; FIG. 5B representing the KBY-1 sample; FIG. 5C representing the Dn-1 sample; FIG. 5D representing the Dgas-2 sample; FIG. 5E representing the KBY-II sample; FIG. 5G representing the Dice-2 sample; and FIG. 5G representing the Dh-01 sample.

TABLE 1 below tabulates materials, characteristics and EM shielding properties of different types of OLC as well as MWCNT, fiber nano-carbon, soot and nano-diamond used in the present study.

TABLE 1

| | DND annealing temperature/ Time | Content of magnetic metal impurities, wt % | Powder Density g/cm3 | Maximum transmission lost | | |
|---|---|---|---|---|---|---|
| | | | | 26-37 GHz | 8-12 GHz | 2-5 GHz |
| OLC Dh-01 | 1800 K/3 hrs | 0.1/Fe | 0.45 | −50 dB | −11 db | −27.4* (Dh-01 + Dgas-02 + Dice-02 + Dn-I) + Nanodiamond |
| Dgas-02 | 1800 K/2 hrs | 0.15/Fe and 0.15/Cr | 0.25 | −30 dB | −6 db | |
| Dice-02 | 1900 K/2.1 hrs | 0.15/Fe and 0.015Cr | 0.2 | −21 dB | −8 db | |
| Dn-I | 2140 K/1 hr | 0.1/Fe | 0.36 | −46 dB | −8.8 db | |
| MWCNT | N/A | 0.9/Fe and 0.4/Co | 0.1 | −42 dB | | |
| KBY-II | N/A | 0.3/Ni | 0.55 | −54 db | −5.9 dB | −24 db |
| KBY-I | N/A | 0.9/Ni | 0.82 | −42 dB | −9 db | −23 dB |
| Nanodiamond | N/A | 0.3/Cr and 0.1/Fe | 0.37 | | | −5.6 db |
| Soot | N/A | 1.3/Fe | 0.42 | | | −10.1 dB |

*Mix of the OLC and nanodiamond. Content of OLC in the mixture is 15 wt %.
*Thickness of the sample holder for the Mix of OLC and DND powder is 2.5 mm.

Measurements of the EM shielding properties of the powders were done using chambers of specific sizes for every frequency range (sizes are listed in TABLE 2). For the 26-37 and 8-12 GHz ranges the thickness of the box for powder is 2 mm.

TABLE 2 tabulates frequency bands, corresponding wavelengths (λ) and sizes of the test chambers used for the study of the nano-carbon powders.

TABLE 2

| f, GHz | λ | Test chamber size |
|---|---|---|
| 26-37 | 11.5-8.1 mm | 7.2 × 3.4 × 2 mm |
| 8-12 | 37.5-25 mm | 23 × 10 × 2 mm |
| 2-5 | 15-6 cm | 90 × 45 × 6 mm |

The characteristic measured was transmission loss. Transmission loss is defined as $10 \times 1\ g(I_t/I_o)$, where $I_o$ is intensity of the incident radiation, $I_t$ is intensity of the transmitted radiation. Transmission loss of −20 dB means that transmitted radiation is reduced 100 times as compared to the incident radiation. For the powders losses are believed to be due to EM absorption and possibly due to partial scattering and reflection (for nanodiamonds, for example). For the films transmission loss is believed to be attributable to a combination of absorption, scattering and reflection. It is known that the primary shielding mode of the carbon nanotubes and carbon black is by absorption, not reflection as with metals or other conducting materials. Since the principal amount of the EM radiation is believed being absorbed by the nanocarbon materials, the term absorption is used, while it should be understood that reflection modes are also possible.

Results of the maximum EM shielding in the studied frequency ranges for the above powders are reported in TABLE 1. As can be seen from the table, all nano-carbon powder materials show good EM shielding properties. EM shielding of some types of OLC demonstrated superior properties in some frequency ranges as compared to the EM shielding of catalytic fiber-like carbon and MWCNT. It is noted that, OLC particles exhibit good shielding properties in all three frequency ranges.

FIG. 5 illustrates the transmission loss of powder samples in the 25.95-37.5 GHz range for different types of OLC, MWCNT and catalytic fiber-like carbon powders for the continues mode measurements in the entire frequency range. The best results are for the KBY-II samples (concentration of magnetic impurities 0.3 wt %), next to it by performance are Dn-1 and Dh-01 OLC samples (concentration of magnetic impurities 0.1 wt %).

It should be noted that the graphs of FIG. 5 are automatically generated from actual test data, but contain artifacts of the printing process that cause the curves to take a slant. These artifacts produce a slight skew in the graphs; however, the graphs are included nevertheless, since they provide an indication of the shape of the attenuation along with relative peaks and valleys.

Transmission loss for the OLC and KBY powder in the 8-12 GHz range is illustrated in TABLE 3 for selected frequencies within the range. Superior EM shielding is observed for Dh-01 powder. High shielding is also observed for KBY-I, Dn-1, and Dice-2 samples. At the same time, the KBY-II sample demonstrated the best EM shielding in the 25.95-37.5 GHz range, but in the 8-12 GHz range it shows rather modest EM shielding. Thus the reported results show the high potential of the OLC material to be EMI shielding material over a broad frequency ranges. At the same time, OLC samples contain much less magnetic impurities than other nano-carbon samples used in the test as well as posses higher electrical resistivity (except nano-diamond samples). Thus, the potential as EM shielding material for OLC encapsulating magnetic nano-particles can be high, since already appreciable effects have been observed for relatively pure OLC with low magnetic impurity content. The low electromagnetic observability characteristics and EMI shielding may potentially be further optimized by increasing or otherwise varying the magnetic impurity content. Also, it appears that the absorption properties of OLC depend on the OLC structure (sp2/sp3 content, aggregate sizes, etc). It should be possible to optimize these factors for a particular application by experimental variation of these parameters.

TABLE 3 tabulates transmission loss (in dB) for the powder samples in the 8-12 GHz range.

TABLE 3

| sample | f, GHz | | | | |
|---|---|---|---|---|---|
| | 8 | 9 | 10 | 11 | 12 |
| KBY-I | −9.0 | −8.8 | −8.6 | −8.4 | −8.2 |
| KBY-II | −5.9 | −5.9 | −5.9 | −5.7 | −4.8 |
| Dice-2 | −7.0 | −8.0 | −7.0 | −7.5 | −8.0 |
| Dn-I | −7.0 | −8.0 | −8.8 | −8.5 | −8.8 |
| Dh-01 | −10.0 | −11.0 | −9.5 | −9.1 | −8.2 |
| Dgas-2 | −6.0 | −5.8 | −4.1 | −4.3 | −4.5 |

TABLE 4 tabulates transmission loss (in dB) for the powder samples in the 2-5 GHz range. This data provides for the comparison of the EM transmission loss through the powders of KBY samples, OLC mix with nanodiamond, detonation soot and detonation nano-diamond. Detonation soot possess lower transmission loss than KBY samples, and higher than DND. Mix containing OLC (15 wt %) has the highest transmission loss of all of these samples.

TABLE 4

| sample | f, GHz | | | | | |
|---|---|---|---|---|---|---|
| | 2.0 | 3.0 | 3.5 | 4.0 | 4.5 | 5.0 |
| KBY-I | −15.0 | −15.0 | −17.3 | −23.0 | −17.0 | −13.0 |
| KBY-II | −15.7 | −15.7 | −14.8 | −17.4 | −20.5 | −24.0 |
| Soot | −9.5 | −9.5 | −8.9 | −10.1 | −9.5 | −8.9 |
| DND | −5.1 | −5.1 | −4.5 | −5.6 | −4.0 | −3.1 |
| Mix of OLC and DND* | −25.1 | −26.3 | | −26.8 | −27.4 | −27.0 |

*Mix of the OLC and nanodiamond. Content of OLC in the mixture is 15 wt %.

Other types of powders were also measured using the same test set up. Three types of powders: glass microspheres covered by Fe coating (60%), Ni coating (60 wt %) or Al coating (80 wt %), demonstrated low transmission loss at 32.2 GHz ranging from 1.9 dB to 0.2 dB. Thus the above results demonstrate in principle the high potential for EMI shielding of all tested nano-carbon samples, including detonation soot and nanodiamonds. These results also demonstrate that OLC powders exhibit superior EM absorbing properties.

Preparation of OLC-Polymer Samples.

Example of PMMA-OLC film preparation: PMMA beads (90,000 MW) were mixed with NMP solvent to make a 40 wt % solution of PMMA (1.46 mL NMP per gram of PMMA). The solution was stirred for two hours (at 300 rpm). Then the required amount of OLC dispersed in NMP (2 wt % OLC suspension in NMP)) was added while continuing to stir the solution.

In order to get the desired percent of OLC in the dried PMMA films, the following amounts of 2 wt % OLC suspension in NMP should be added to 40% solution of PMMA: 0.5% (OLC in dried PMMA)=250 μL/g PMMA, 1%=505 μL/g PMMA, 2%=1020 μL/g PMMA. After mixing with OLC suspension, the polymer solution was stirred at 400 rpm for 2 hours, then at 200 rpm overnight. Then the suspension was spin coated on a 3-inch Si substrates (at 550 rpm for 45 sec) and dried in a vacuum oven for 1 hour at 80° C., then, with the pump on, vented while still heated to 80° C. The vacuum was resumed, the heat was increased to 120° C. for 30 minutes, and then the heat was increased to 180° C. for 30 minutes.

Preparation of Dice-2, Dgas-2 and Dh-01 samples themselves was described above. Powder OLC-O was annealed at 1900K for 2 hours.

For quality films, the OLC is preferably uniformly distributed in the polymer matrix. For this, the OLC should be well dispersed in the related solvent such as for example, anisole, NMP, FC-75 or other solvents. Proper distribution of OLC in a solvent can be done using sonication. It was found that dispersivity is sensitive to the ultrasonic power intensity delivered to the system. 5-10 min sonication while avoiding heating of the suspension is recommended. In this experiment, sonication was carried out using a sonicator equipped with a tapered titanium horn with a tip diameter 3 mm (Cole-Parmer® 750-Watt Ultrasonic Homogenizer EW-04711-60, 20 kHz) that is directly immersed in the sample. Output power was 10 W, output intensity was ~100 W/cm$^2$.

Figure 6:
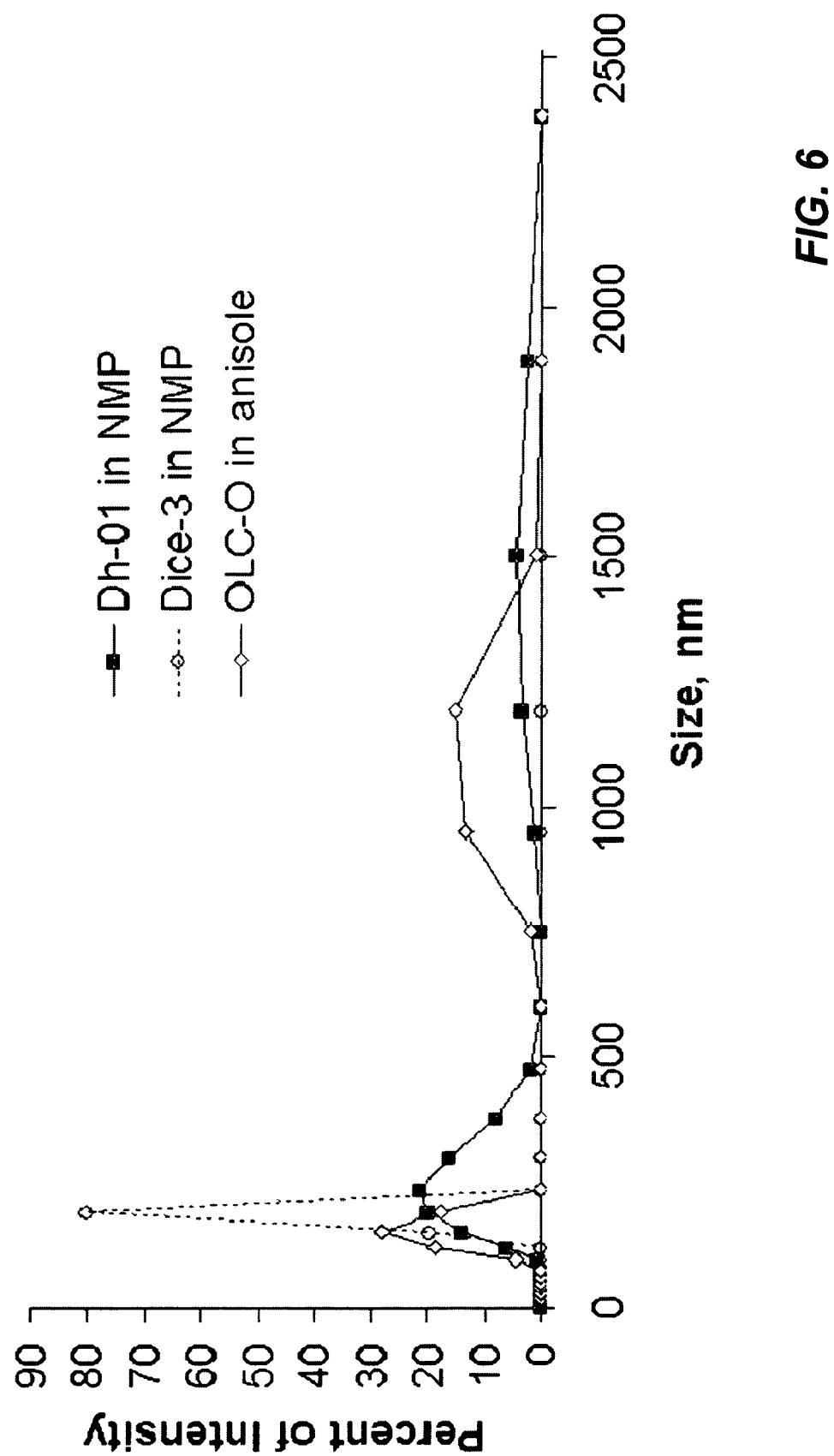
FIG. 6 is a graph of size distribution of several OLC samples in NMP and anisole solvents measured using the photon correlation spectroscopy approach.

FIG. 6 illustrates the OLC size distributions in solvents measured using the photon correlation spectroscopy approach, the Beckman-Coulter N5 Submicron Particle Size Analyzer that is capable of defining nano-particle size distributions in the 3-3000 nm size range. Dice-3 is OLC obtained from Dice DND annealed at 2040K. High dispersivity of OLC in anisole and NMP (~200 nm aggregates and less) was achieved. OLC sizes after 5 min sonication in NMP were 232, 230, and 188 nm for Dh-01, Dh-02, and Dice-3 respectively.

For the solvent-based polymer solutions it may be advantageous for the nano-particles to have high resistivity to agglomeration and sedimentation in a solvent. Varying the solvent for a given polymer (for example, using NMP versus anisole for preparation of PMMA coatings), it is possible to improve dispersivity and uniformity of distribution of OLC in the polymer matrix by a proper chose of a solvent. NMP as a solvent is very attractive for processing of OLC-based polymer composites (for example, PMMA, polyamide and others). FIG. 6 illustrates very good dispersivity of OLC in NMP. Stable solutions of up to 8 wt % of OLC in NMP can be readily achieved using this example method. As a mechanism for improved dispersivity, surface functionalization of OLC can be performed using, for example, atmospheric pressure plasma functionalization (fluorination) or known means of functionalization of carbon structures as those used for carbon nano-tubes.

In another example, polyimide (PI) solution and an NMP solution containing OLC (sonicated for 5 min) were mixed and mechanically stirred for 24 hrs at 300 rpm. Then the mixture was applied by spin-on onto a silicon wafer under normal atmospheric pressure and baked in an oven at 400° C. in a nitrogen atmosphere for 1 hr. The resulting ND content in PI was from 1 to 3 wt. % for different samples. Thin films 6 μm thick of OLC in a polyimide matrix were peeled off of the Si substrate and tested for EM absorption using standard waveguide systems. No appreciable EM adsorption was detected for meaningful signal-to-noise ratio for 6 μm thick films.

In another example, of preparation of OLC in a polyurethane binding matrix, Norland Optical Adhesive 73 (NOA73) solution was used. It is a one part system wherein 100% solids cure when exposed to long wavelength ultraviolet light (it took approximately 10 min to cure a 300 μm thick film of pure NOA73). In these experiments, 0.25 g of OLC, or for comparison the same amount of MWCNT (20 nm diameter, 0.5-1 μm long, 97 wt % purity), were added to 5 ml of the solution during stirring of the solution at 300 rpm resulting in 4 wt % of OLC(MWCNT) in the dried film. Then the mixture was stirred for two days at 500 rpm. The OLC-polyurethane mixture was cast onto a thin glass substrate, pressed to form a thin film and then cured by exposure for 1 hr to a lamp emitting long wave UV radiation. The resulting film thicknesses varied between 100 µm and 200 µm. Note that curing of the composite films requires much longer time than pure NOA73 and depends on the OLC (MWCNT) concentration and film thickness. Free-standing polyurethane-OLC films of a 2 inch by 2 inch in size were formed. It should be noted that if a several mm thick layer or a droplet of NOA73 mixture with OLC, nano-diamonds or soot were exposed to UV radiation, while the outer part of the droplet/layer was cured, the inner part remained uncured and soft even at radiation longer than an hour. Such encapsulated polymer suspensions of OLC within cured polymer shell can be also useful embodiment for particular EM shielding applications. For purposes of this document, such a structure with a partially cured binding matrix will still be considered to fall within the definition of a binding matrix.

Characterization of EM Shielding Properties of Films

Figure 7:
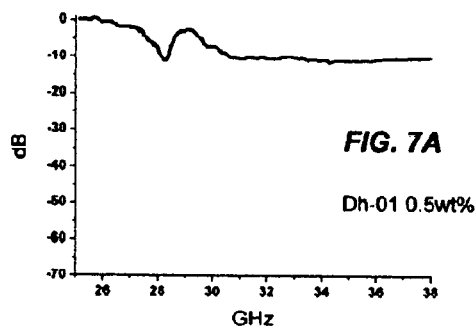
FIG. 7 is a collection of graphs (FIGS. 7A-7K) of transmission loss for PMMA-OLC thin films on Si substrate in the 25.95-37.5 GHz range.
Figure 7:
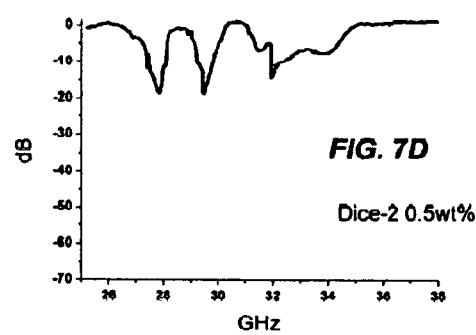
Figure 7:
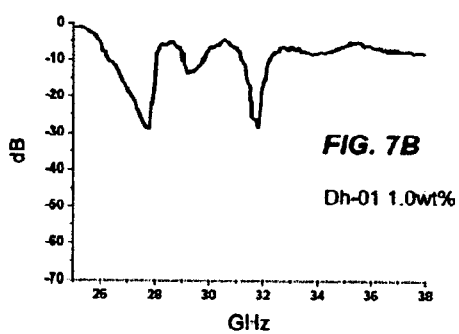
Figure 7:
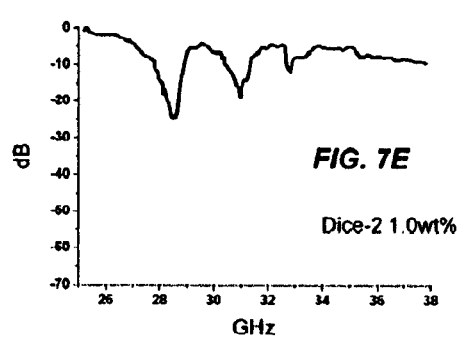
Figure 7:
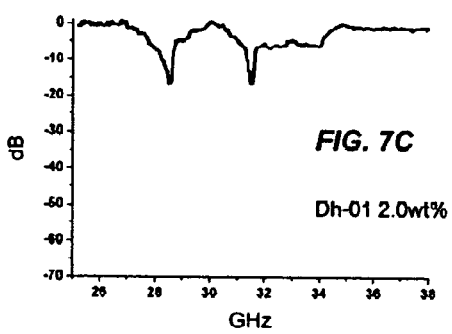
Figure 7:
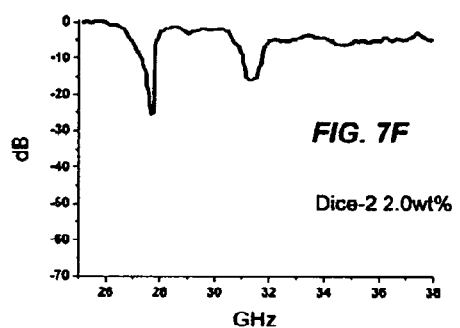

Results of measurement of the transmission loss in the range 25.95-37.5 GHz for 11 samples are illustrated in FIG. 7. Four types of OLC were used to fabricate OLC-PMMA matrix films on Si wafers (300 µm thick, 30 Ohm.cm resistivity) with three different concentrations of OLC. Average films thicknesses varied between about 40-150 µm. As can be seen from the figures, good transmission loss (better than 30 dB) is demonstrated for a variety of OLC types, while for others the transmission loss is more modest (less than 10 dB), but still significant. Different OLC types have different size distribution of aggregates in the solvents and, therefore, in the polymer films; different surface chemistry; different content of defects (holes, sp2/sp3 irregularities); different amount of metallic impurities, the results vary from film to film. It can be concluded that for these experiments up to about 30 dB transmission loss can be obtained for rather thin films (about one hundred microns thick) on a Si substrate and with a relatively low concentration of OLC in the polymer matrix. Those skilled in the art will appreciate, upon consideration of the present teachings, that further optimization for a particular set of constraints is likely possible with additional experiments.

TABLE 5 below tabulates transmission loss (dB) of OLC films in PMMA matrix on Si substrate in the 25.95-37.5 GHz region.

TABLE 5

| sample | Resonances, GHz | f. GHz | | | | | |
|---|---|---|---|---|---|---|---|
| | | 26.0 | 28.0 | 30.0 | 32.0 | 35.0 | 37.5 |
| 0.5% Dh-01 | 28.9 | 3.1 | 12.3 | 8.4 | 12.0 | 1.2 | 3.2 |
| 1% Dh-01 | 28.0/31.5 | 4.0 | 28.2 | 9.7 | 12.8 | 3.4 | 4.1 |
| 2% Dh-01 | 28.9/32 | 2.4 | 7.2 | 4.0 | 18.1 | 2.5 | 5.2 |
| 0.5% OLC-O | 28.9/31.8/32.5 | 3.5 | 15.2 | 18.3 | 6.4 | 3.1 | 4.4 |
| 1% OLC-O | 28.9/31 | 3.0 | 18.3 | 4.5 | 18.4 | 2.8 | 3.7 |
| 2% OLC-O | 28.9/32 | 3.2 | 15.2 | 4.8 | 15.4 | 4.2 | 5.2 |
| 0.5% Dice-2 | 28.4/29/31.8 | 2.8 | 13.1 | 19.6 | 6.2 | 4.9 | 4.2 |
| 1% Dice-2 | 28.9/31.5 | 3.3 | 26.0 | 24.9 | 3.7 | 2.3 | 1.4 |
| 2% Dice-2 | 28.9/32 | 1.3 | 28.9 | 3.6 | 16.0 | 3.1 | 3.8 |
| 0.5% Dgas-2 | 28.8/32 | 1.8 | 23.9 | 3.4 | 24.3 | 3.2 | 2.2 |
| 1% Dgas-2 | 28.9/32 | 2.8 | 28.9 | 28.9 | 6.1 | 2.2 | 1.7 |

FIG. 7 depicts the results of various transmission loss tests on the samples for the PMMA-OLC thin films on Si substrate samples in the 25.95-37.5 GHz range. FIG. 7A represents the absorption of the Dh-01 0.5% by weight, 90 µm film thickness sample; FIG. 7B represents the Dh-01 1.0% by weight, 120 µm film thickness sample; FIG. 7C represents the Dh-01 2.0% by weight 120 µm film thickness sample; FIG. 7D represents the Dice-2 0.5% by weight 150 µm film thickness sample, FIG. 7E represents the Dice-2 1.0% by weight 110 µm film thickness sample; FIG. 7F represents the Dice-2 2.0% by weight 95 µm film thickness sample; FIG. 7G represents the O-OLC 0.5% by weight 50 µm film thickness sample; FIG. 7H represents the O-OLC 1.0% by weight 120 µm film thickness sample; FIG. 7I represents the O-OLC 2.0% by weight 80 µm film thickness sample; FIG. 7J represents the Dgas-2 0.5% by weight 40 µm film thickness sample; and FIG. 7K represents the Dgas-2 1.0% by weight 150 µm film thickness sample.

It should be noted that the graphs of FIG. 7 are also automatically generated from actual test data, but contain similar artifacts of the printing process as those of FIG. 5 that causes the curves to take a slant. These artifacts produce a slight skew in the graphs which in some instances appear to show that are several data points for a particular frequency. An example of this skew is evident in FIG. 7F at approximately 28 GHz for example. The graphs are included nevertheless, since they provide an indication of the shape of the attenuation curve along with the positions of relative peaks and valleys. The actual data are clarified by tabulation at noteworthy frequencies.

Other types of powders as additives to an epoxy matrix were also measured earlier within the same set up and are provided for a comparison. Three types of powders: glass microspheres covered by a Fe coating (60%), Ni coating (60 wt %) or Al coating (80 wt %), were mixed with epoxy and cured in the shape of a ring (3 mm thick). The transmission loss at 32.2 GHz did not exceed 2-2.2 dB.

TABLE 6-7 illustrates the transmission loss for the composites with a PMMA matrix for the four types of OLC (in the amount of 1 wt % of OLC in the cured polymer) in the 8-12 and 2-5 GHz regions, correspondingly. The nano-composite as in the description above was baked onto a Si wafer. As can be seen from the TABLE 5, different types of OLC provide different transmission losses. Thus, optimization of the film performance is possible by varying the structure and aggregate sizes of OLC.

TABLE 6 below tabulates transmission loss (in dB) for the PMMA-OLC thin films on Si substrate samples in the 8-12 GHz range.

TABLE 6

| sample | f, GHz | | | | | Film thickness, µm |
|---|---|---|---|---|---|---|
| | 8.0 | 9.0 | 10.0 | 11.0 | 12.0 | |
| 1% Dh-01 | −23.6 | −23.6 | −23.6 | −23.6 | −23.6 | 120 |
| 1% OLC-O | −14.5 | −14.4 | −14.4 | −14.1 | −13.9 | 120 |
| 1% Dice-2 | −23.8 | −23.5 | −23.0 | −23.0 | −23.0 | 110 |
| 1% Dgas-2 | −25.2 | −25.0 | −24.2 | −23.6 | −23.2 | 150 |

TABLE 7 below tabulates transmission loss (in dB) for the PMMA-OLC thin films on Si substrate samples in the 2-5 GHz range.

TABLE 7

| sample | f, GHz | | | | | |
|---|---|---|---|---|---|---|
| | 2.0 | 3.0 | 3.5 | 4.0 | 4.5 | 5.0 |
| 1% Dh-01 | −28.0 | −28.0 | −28.0 | −28.5 | −26.5 | −25.6 |
| 1% OLC-O | −19.5 | −19.5 | −18.8 | −18.4 | −16.7 | −15.8 |
| 1% Dice-2 | −28.3 | −28.3 | −28.0 | −29.2 | −26.5 | −25.4 |
| 1% Dgas-2 | −29.2 | −29.2 | −29.2 | −30.5 | −27.0 | −26.0 |

A test for measuring complex permittivity at microwave frequencies according to the ASTM D2520 (method B, perturbation of a resonant cavity) was performed for a pure polyurethane film and polyurethane films containing 2 wt % of Dh-02 (0.25 mm thick) and 2 wt % of Dh-01 (0.1 mm thick) OLC within X-band. The loss tangent of a sample with OLC was increased almost by a factor of three to four, 0.103 and 0.128 for Dh-02 and Dh-01 OLC-containing films, correspondingly, as compared to the pure polyurethane film (loss tangent ~0.03), demonstrating the use of OLC for increasing the dielectric loss of the materials.

EXAMPLE OF NANO-CARBON ABSORBANCE IN TERAHERTZ REGION

It is believed that OLC particles can be utilized to absorb EM radiation over a broad range of frequencies. To verify this, measurements were made in the 12-30 THz range (due to the availability of suitable equipment for measurements in this range Samples were prepared by mixing OLC or nano-diamond powders with SpectroGrade™ KBr powder (ICL, International Crystal Laboratories, Garfield, N.J. 07026) in a Wig-L-Bug™ grinding mill (ICL) with agate vial and pestle (ICL) for 30 sec. Pellets were pressed with a handheld Quick press (ICL). Spectra were collected for the samples of Dh-01 OLC and nanodiamond obtained by explosion of TNT/RDX in an ice coating and non-diamond carbon oxidized using chromic anhydride. DND was dehydrated at 400° C. for 1 hour. Samples were prepared with controlled thickness of the KBr pellet (0.25 mm) and controlled concentration of the sample in the KBr powder. Samples were prepared at 2 levels of weight concentration for DNDs (1.06% and 2.24%) and 3 levels for the OLC (1.898%, 1.02%, and 0.0218%).

Absorbance spectra were collected in the frequency range of 12-30 THz using a Varian 7000e FTIR spectrometer in transmission mode with averaging over 500 spectra. Absorbance was calculated over each KBr blank.

Figure 8:
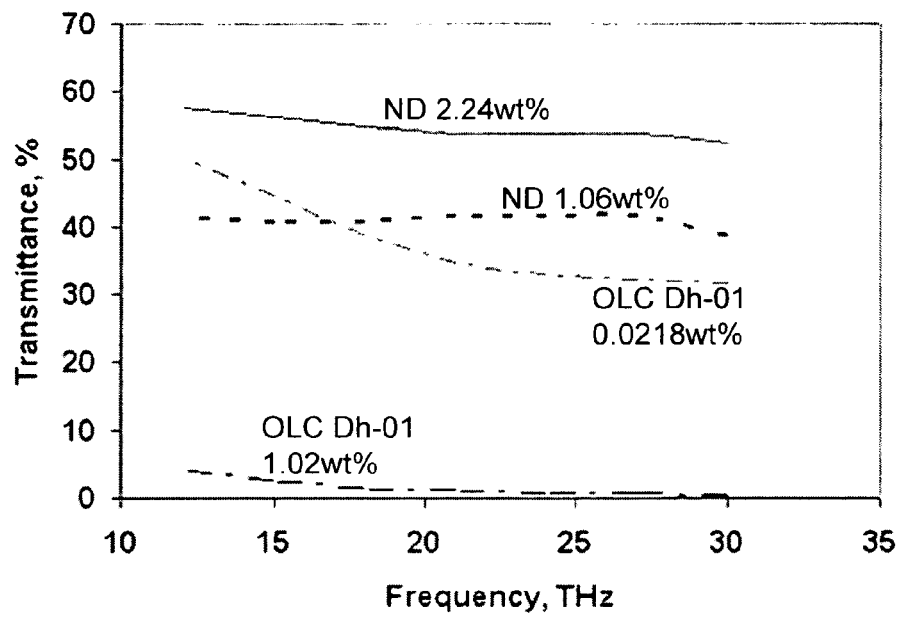
FIG. 8 is a graph that shows Transmittance (%) for samples of OLC and nano-diamonds in the frequency region of 12-30 THz.

Transmittance (%) for all 4 samples are shown in FIG. 8. Transmittance of the pellet containing ~1 wt % of OLC is about 1%—much lower than transmittances for the nanodiamond-containing samples with 1% or 2 wt % of nanodiamonds. The pellet containing only ~0.02 wt % of OLC is comparable in transmittance to the pellets containing 1% and 2 wt % of ND.

Figure 9:
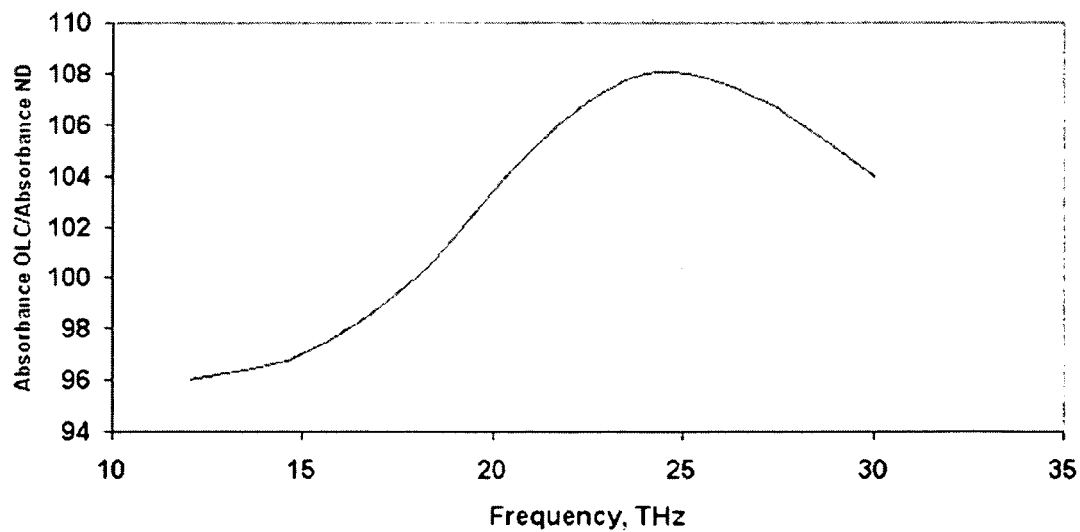
FIG. 9 is a graph that shows the ratio of the absorbance (OLC/NDs) in the frequency region of 12-30 THz.

Absorbance spectra of the samples were recalculated to 100% concentration (pure sample with thickness of 0.25 mm) for the OLC and NDs using the data with the lowest concentrations of OLC and NDs. FIG. 9 shows the ratio of the absorbance (OLC/NDs) in the frequency region of 12-30 THz. Absorbance of the OLC is about 2 orders of magnitude higher than absorbance of the NDs in this region.

Hence, as demonstrated above, an electromagnetic radiation attenuating coating can be provided for attenuating electromagnetic radiation in the wide frequency range by use of a binding matrix to bind an operative quantity of electromagnetic radiation attenuating nano-particles suspended in the binding matrix, wherein the electromagnetic radiation attenuating nano-particles are onion-like-carbon (OLC) particles (the term including the aggregates thereof). Since it is believed that the primary attenuation mechanism is by absorption, when the term absorption is used above it should be understood that other modes that contribute to attenuation (such as the reflection mode) are also possible. While only particular frequency ranges have been tested due to testing constraints and initial investigation of frequencies of particular interest, it is believed clear that OLC particles can be utilized as taught for EM attenuation in most, if not all, of the range from several hundred MHz up to several tens of THz.

Figure 10:
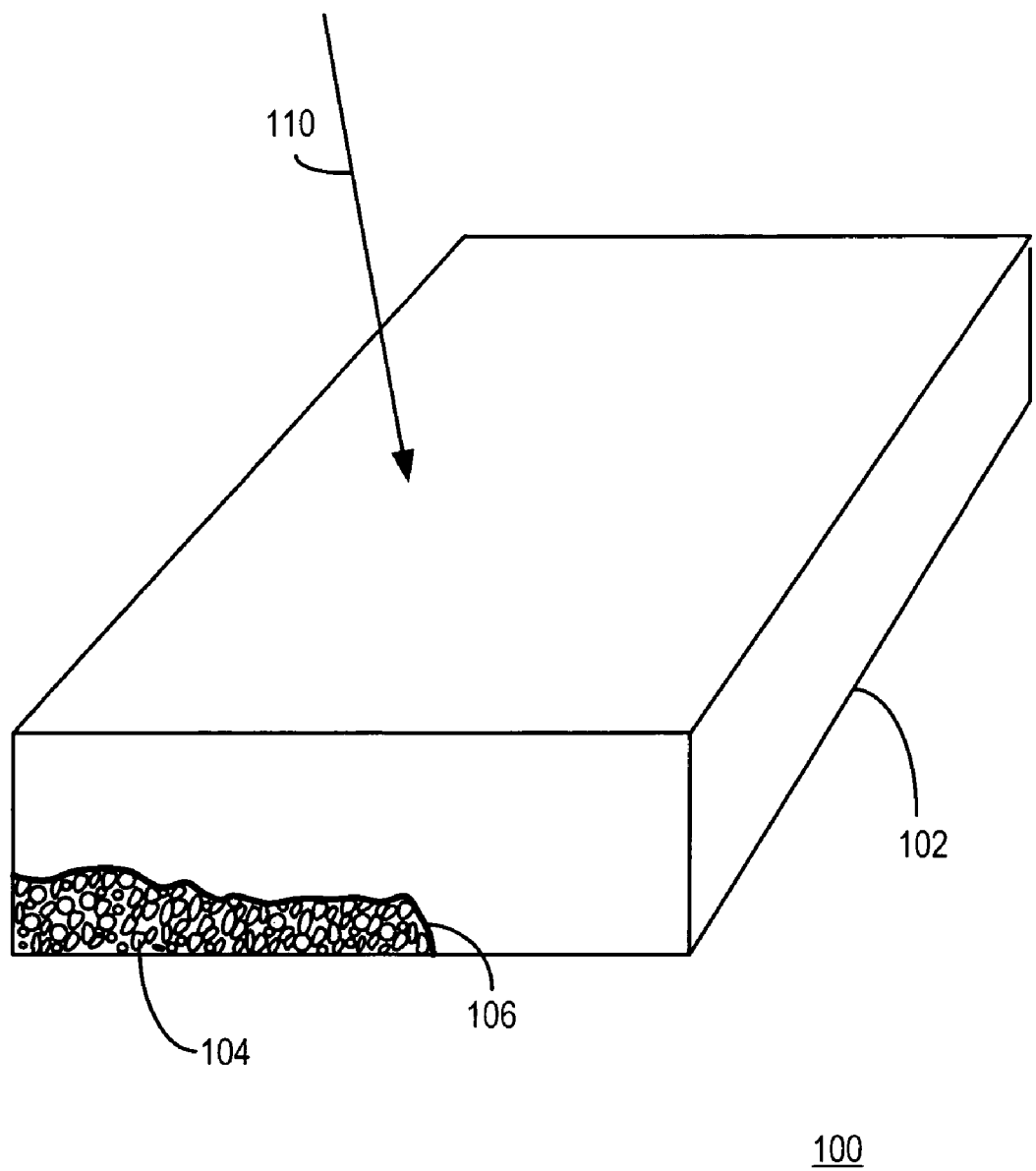
FIG. 10 depicts another EM or Radar absorptive structure consistent with certain embodiments of the present invention.

The above measurements also demonstrated that powders containing OLC particles (including aggregates thereof) exhibit outstanding shielding of EM waves in the frequency ranges tested. Hence, if a powder containing OLC particles is encapsulated within an enclosure (e.g., between two layers of enclosing material), such a structure would make an effective EMI shielding structure. Such a structure is depicted in a simplistic form in FIG. 10 as structure 100 in which an enclosure 102 encapsulates a material containing OLC particles 104 as shown at cutaway 106. The material may be either a powder or a suspension or past of OLC particles. Such a structure would attenuate EM radiation 110 impinging on such a structure. Multiple-stacked structures are also possible. In another application, OLC particles can be suspended in a liquid suspension and then sprayed as an aerosol. Those skilled in the art will appreciate, upon consideration of the present teaching, that many other mechanisms may be utilize to capitalize on the EM absorptive properties of OLC particles as disclosed herein.

Thus, an electromagnetic radiation attenuating structure for attenuating electromagnetic radiation in the frequency range of approximately 0.5 GHz to 30 THz, consistent with certain embodiments has an enclosure with a powder or suspension of electromagnetic radiation attenuating nano-particles disposed within the enclosure, wherein, the electromagnetic radiation attenuating nano-particles comprise onion-like-carbon (OLC) particles.

In each embodiment described above, many variations of the composition of the aerosol, suspension or material within a binding matrix are possible without departing from embodiments consistent with the present invention. For example, without limitation, the OLC particles can be mixed or blended with carbon nano-tubes, detonation soot, nano-diamonds, carbon onions, fullerenes, carbon black, fiber nano-carbons, diamondoids and other materials.

Thus, an electromagnetic radiation attenuating material for attenuating electromagnetic radiation in the frequency range of approximately 500 MHz to 30 THz, consistent with certain embodiments, has electromagnetic radiation attenuating nano-particles suspended in an aerosol, wherein, the electromagnetic radiation attenuating nano-particles comprise onion-like-carbon (OLC) particles.

Many variations will occur to those skilled in the art upon consideration of the present teachings. In one variation, the same OLC particles (alone or modified with additives, etc. as described above) can be blended with a binding matrix, molded or otherwise formed into a desired shape, and then cured to form a freestanding structure having EM absorptive properties. Many other variations are possible. Also, while the claims call out a broad frequency range, certain embodiments, depending upon carrier, quality of the OLC particles, additives, etc., may have EM attenuating properties at only a narrower sub-range of frequencies within this frequency range. For example, the test depicted in FIG. 7B illustrates that most attenuation over the range tested occurs in the 26 to 32 GHz range (within the broader range tested) with relatively lower attenuation occurring outside this narrower range. Hence the claims should be interpreted to mean that attenuation can take place at any narrower frequency range within the specified frequency range, or over the entire specified frequency range.

While certain illustrative embodiments have been described, it is evident that many alternatives, modifications, permutations and variations will become apparent to those skilled in the art in light of the foregoing description.

What is claimed is:

1. An electromagnetic radiation attenuating material for attenuation of electromagnetic radiation in at least a portion of the frequency range of approximately 500MHz to 30 THz, comprising:
   a binding matrix; and
   an operative quantity of electromagnetic radiation attenuating nano-particles suspended in the binding matrix, wherein,
   the electromagnetic radiation attenuating nano-particles comprise onion-like-carbon (OLC) particles.

2. The electromagnetic radiation attenuating material in accordance with claim 1, wherein the onion-like-carbon particles comprise greater than 0.5% by weight of the coating in a cured state.

3. The electromagnetic radiation attenuating material in accordance with claim 1, wherein the onion-like-carbon particles comprise between 0.1% and 20% by weight of the coating in the cured state.

4. The electromagnetic radiation attenuating material in accordance with claim 1, wherein the onion-like-carbon particles comprise between 0.5% and 20% by weight of the coating in a cured state.

5. The electromagnetic radiation attenuating material in accordance with claim 1, wherein the onion-like-carbon particles comprise between 0.5% and 5% by weight of the coating in a cured state.

6. The electromagnetic radiation attenuating material in accordance with claim 1, wherein the binding matrix is selected from the group consisting of: a polymer matrix, a paint, an epoxy, polytetrafluoroethelyne, resins, polycarbonate, polystyrene, polyurethane, polyimide, acrylics, paints, epoxies, methacrylic, phenolic, silicone, polyester, polystyrene, polyurethane foam (PUF), conducting polymers, vinyl polymers, phenol phormaldehyde, neoprene, rubber, silicone rubber compounds, polypyrrole, polyanilene, polyacetylene, polythiophene, poly-p-phenylene, polyacrylthiophene, poly-p-phenylene-benzo-biz-thiozole (PBT), polymethylmethacrylate, butadieneacrylonitrile, conductive fibers, ceramics, conductive polyethylenes (CPE), polyethyelene compounds with polyisobutylene, ethylene ethyl acrylate copolymers, extruded polystyrene foam, and expanded polyvinylchloride.

7. The electromagnetic radiation attenuating material in accordance with claim 1, wherein the binding matrix containing the electromagnetic radiation attenuating nano-particles is suitable for application as a coating to a substrate using at least one of an aerosol spray process, an electrostatic spray process, a hot melt spray process, a high velocity high temperature spray process, a thermal spray process, a plasma spray process, an ultrasonic spray process, a fluidized bed process, a dipping process, a painting process, a spin-on process, a wipe-on process, a plasma spraying process, a casting process, a molding process and an injection molding process.

8. The electromagnetic radiation attenuating material in accordance with claim 1, wherein at least some of the electromagnetic radiation attenuating nano-particles encapsulate magnetic nano-particles or contain magnetic impurities.

9. The electromagnetic radiation attenuating material in accordance with claim 1, wherein the onion-like-carbon particles have an average size of from about 5 nm to about 1 µm.

10. The electromagnetic radiation attenuating material in accordance with claim 1, wherein the coating has a cured thickness greater than about 10 µm.

11. The electromagnetic radiation attenuating material in accordance with claim 1, wherein at least certain of the electromagnetic radiation attenuating nano-particles comprise agglomerations of OLC particles.

12. The electromagnetic radiation attenuating material in accordance with claim 1, wherein the onion-like-carbon particles are produced by annealing nano-diamond particles at temperatures exceeding 1400K.

13. The electromagnetic radiation attenuating material in accordance with claim 1, wherein the onion-like-carbon particles are produced by annealing nano-diamond particles at temperatures exceeding 1800K.

14. The electromagnetic radiation attenuating material in accordance with claim 1, wherein the onion-like-carbon particles are produced by annealing nano-diamond particles at temperatures exceeding 2000K.

15. The electromagnetic radiation attenuating material in accordance with claim 1, wherein the onion-like-carbon particles are produced by annealing at least one of detonation nano-diamond particles and detonation soot.

16. The electromagnetic radiation attenuating material in accordance with claim 1, wherein the onion-like-carbon particles are functionalized.

17. The electromagnetic radiation attenuating material in accordance with claim 1, wherein the electromagnetic radiation attenuating nano-particles further comprise at least one of carbon nano-tubes, detonation soot, nano-diamonds, carbon onions, fullerenes, carbon black, fiber nano-carbons.

18. The electromagnetic radiation attenuating material in accordance with claim 1, applied to a substrate as an electromagnetic radiation attenuating coating.

19. The electromagnetic radiation attenuating material in accordance with claim 1, molded or otherwise formed into a freestanding structure having electromagnetic radiation attenuating properties.

20. An electromagnetic radiation attenuating structure for absorbing electromagnetic radiation in at least a portion of the frequency range of approximately 500 MHz to 30 THz, comprising:
   a substrate;
   a layer of electromagnetic radiation attenuating material covering at least a portion of the substrate, wherein the electromagnetic radiation attenuating material comprises:
   a binding matrix; and
   an operative quantity of electromagnetic radiation attenuating nano-particles suspended in the binding matrix, wherein,
   the electromagnetic radiation attenuating nano-particles comprise onion-like-carbon (OLC) particles.

21. The electromagnetic radiation attenuating structure in accordance with claim 20, wherein the onion-like-carbon particles comprise greater than 0.5% by weight of the coating in a cured state.

22. The electromagnetic radiation attenuating structure in accordance with claim 20, wherein the onion-like-carbon particles comprise between 0.1% and 20% by weight of the coating in a cured state.

23. The electromagnetic radiation attenuating structure in accordance with claim 20, wherein the onion-like-carbon particles comprise between 0.5% and 20% by weight of the coating in a cured state.

24. The electromagnetic radiation attenuating structure in accordance with claim 20, wherein the onion-like-carbon particles comprise between 0.5% and 5% by weight of the coating in a cured state.

25. The electromagnetic radiation attenuating structure in accordance with claim 21, wherein the binding matrix is selected from the group consisting of: a polymer matrix, a paint, an epoxy, polytetrafluoroethelyne, resins, polycarbonate, polystyrene, polyurethane, polyimide, acrylics, paints, epoxies, methacrylic, phenolic, silicone, polyester, polystyrene, polyurethane foam (PUF), conducting polymers, vinyl polymers, phenol phormaldehyde, neoprene, rubber, silicone rubber compounds, polypyrrole, polyanilene, polyacetylene, polythiophene, poly-p-phenylene, polyacrylthiophene, poly-p-phenylene-benzo-biz-thiozole (PBT), polymethylmethacrylate, butadieneacrylonitrile, conductive fibers, ceramics, conductive polyethylenes (CPE), polyethyelene compounds with polyisobutylene, ethylene ethyl acrylate copolymers, extruded polystyrene foam, and expanded polyvinylchloride.

26. The electromagnetic radiation attenuating structure in accordance with claim 20, wherein the binding matrix containing the electromagnetic radiation attenuating nano-particles is suitable for application to a substrate using at least one of an aerosol spray process, an electrostatic spray process, a hot melt spray process, a high velocity high temperature spray process, a thermal spray process, a plasma spray process, an ultrasonic spray process, a fluidized bed process, a dipping process, a painting process, a spin-on process, a wipe-on process, a plasma spraying process, a casting process, a molding process, and an injection molding process.

27. The electromagnetic radiation attenuating structure in accordance with claim 20, wherein at least some of the electromagnetic radiation attenuating nano-particles encapsulate magnetic nano-particles or contain magnetic impurities.

28. The electromagnetic radiation attenuating structure in accordance with claim 20, wherein the onion-like-carbon particles have an average size of from about 5 nm to about 1.0 µm.

29. The electromagnetic radiation attenuating structure in accordance with claim 20, wherein the substrate comprises an aircraft part.

30. The electromagnetic radiation attenuating structure in accordance with claim 20, wherein the coating has a cured thickness greater than 10 µm.

31. The electromagnetic radiation attenuating structure in accordance with claim 20, wherein at least certain of the electromagnetic radiation attenuating nano-particles comprise agglomerations of OLC particles.

32. The electromagnetic radiation attenuating structure in accordance with claim 20, wherein the onion-like-carbon particles are produced by annealing nano-diamond particles at temperatures exceeding 1400K.

33. The electromagnetic radiation attenuating structure in accordance with claim 20, wherein the onion-like-carbon particles are produced by annealing nano-diamond particles at temperatures exceeding 1800K.

34. The electromagnetic radiation attenuating structure in accordance with claim 20, wherein the onion-like-carbon particles are produced by annealing nano-diamond particles at temperatures exceeding 2000K.

35. The electromagnetic radiation attenuating structure in accordance with claim 20, wherein the onion-like-carbon particles are produced by annealing at least one of detonation nano-diamond particles and detonation soot.

36. The electromagnetic radiation attenuating structure in accordance with claim 20, wherein the onion-like-carbon particles are functionalized.

37. The electromagnetic radiation attenuating structure in accordance with claim 20, wherein the electromagnetic radiation attenuating nano-particles further comprise at least one of carbon nano-tubes, detonation soot, nano-diamonds, carbon onions, fullerenes, carbon black, fiber nano-carbons.

38. An electromagnetic radiation attenuating structure for absorbing electromagnetic radiation in at least a portion of the frequency range of approximately 500 MHz to 30 THz, comprising:
an enclosure having walls;
a powder or suspension of electromagnetic radiation attenuating nano-particles disposed within and held in place by the walls of the enclosure, wherein,
the electromagnetic radiation attenuating nano-particles comprise onion-like-carbon (OLC) particles, and where the resulting attenuating structure attenuates electromagnetic radiation in at least a portion of the frequency range of approximately 500 MHz to 30 THz.

39. The electromagnetic radiation attenuating structure in accordance with claim 38, wherein at least some of the electromagnetic radiation attenuating nano-particles encapsulate magnetic nano-particles or contain magnetic impurities.

40. The electromagnetic radiation attenuating structure in accordance with claim 38, wherein the onion-like-carbon particles have an average size of from about 5 nm to about 1.0 µm.

41. The electromagnetic radiation attenuating structure in accordance with claim 38, wherein at least certain of the electromagnetic radiation attenuating nano-particles comprise agglomerations of OLC particles.

42. The electromagnetic radiation attenuating structure in accordance with claim 38, wherein the onion-like-carbon particles are produced by annealing nano-diamond particles at temperatures exceeding 1400K.

43. The electromagnetic radiation attenuating structure in accordance with claim 38, wherein the onion-like-carbon particles are produced by annealing nano-diamond particles at temperatures exceeding 1800K.

44. The electromagnetic radiation attenuating structure in accordance with claim 38, wherein the onion-like-carbon particles are produced by annealing nano-diamond particles at temperatures exceeding 2000K.

45. The electromagnetic radiation attenuating structure in accordance with claim 38, wherein the onion-like-carbon particles are produced by annealing at least one of detonation nano-diamond particles and detonation soot.

46. The electromagnetic radiation attenuating structure in accordance with claim 38, wherein the onion-like-carbon particles are functionalized.

47. The electromagnetic radiation attenuating structure in accordance with claim 38, wherein the electromagnetic radiation attenuating nano-particles further comprise at least one of carbon nano-tubes, detonation soot, nano-diamonds, carbon onions, fullerenes, carbon black, fiber nano-carbons.

48. The electromagnetic radiation attenuating structure in accordance with claim 38, wherein the enclosure comprises a first layer and a second layer of material with the electromagnetic radiation attenuating nano-particles disposed therebetween.

49. An electromagnetic radiation attenuating material for attenuating electromagnetic radiation in at least a portion of the frequency range of approximately 500 MHz to 30 THz, comprising electromagnetic radiation attenuating nano-particles suspended in an aerosol, wherein, the electromagnetic radiation attenuating nano-particles comprise onion-like-carbon (OLC) particles.

50. The electromagnetic radiation attenuating material in accordance with claim 49, wherein at least some of the electromagnetic radiation attenuating nano-particles encapsulate magnetic nano-particles or contain magnetic impurities.

51. The electromagnetic radiation attenuating material in accordance with claim 49, wherein the onion-like-carbon particles have an average size of from about 5 nm to about 1.0 μm.

52. The electromagnetic radiation attenuating material in accordance with claim 49, wherein at least certain of the electromagnetic radiation attenuating nano-particles comprise agglomerations of OLC particles.

53. The electromagnetic radiation attenuating material in accordance with claim 49, wherein the onion-like-carbon particles are produced by annealing nano-diamond particles at temperatures exceeding 1400K.

54. The electromagnetic radiation attenuating material in accordance with claim 49, wherein the onion-like-carbon particles are produced by annealing nano-diamond particles at temperatures exceeding 1800K.

55. The electromagnetic radiation attenuating material in accordance with claim 49, wherein the onion-like-carbon particles are produced by annealing nano-diamond particles at temperatures exceeding 2000K.

56. The electromagnetic radiation attenuating material in accordance with claim 49, wherein the onion-like-carbon particles are produced by annealing at least one of detonation nano-diamond particles and detonation soot.

57. The electromagnetic radiation attenuating material in accordance with claim 49, wherein the onion-like-carbon particles are functionalized.

58. The electromagnetic radiation attenuating structure in accordance with claim 48, wherein the electromagnetic radiation attenuating nano-particles further comprise at least one of carbon nano-tubes, detonation soot, nano-diamonds, carbon onions, fullerenes, carbon black, fiber nano-carbons.

59. The electromagnetic radiation attenuating material in accordance with claim 48, wherein at least some of the electromagnetic radiation attenuating nano-particles are enclosed within metal shells.

* * * * *

UNITED STATES PATENT AND TRADEMARK OFFICE
CERTIFICATE OF CORRECTION

PATENT NO. : 7,612,138 B2  Page 1 of 1
APPLICATION NO. : 11/338527
DATED : November 3, 2009
INVENTOR(S) : Kuznetsov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 695 days.

Signed and Sealed this

Nineteenth Day of October, 2010

David J. Kappos
*Director of the United States Patent and Trademark Office*